(12) United States Patent
Kim et al.

(10) Patent No.: US 12,554,246 B2
(45) Date of Patent: Feb. 17, 2026

(54) METHOD AND APPARATUS FOR SETTING SEMICONDUCTOR DEVICE MANUFACTURING PARAMETER

(71) Applicants: SK hynix Inc., Icheon (KR); POSTECH ACADEMY-INDUSTRY FOUNDATION, Pohang (KR)

(72) Inventors: Choong Ki Kim, Icheon (KR); Hong Chul Byun, Icheon (KR); Hyeok Yun, Pohang (KR); Rock Hyun Baek, Pohang (KR)

(73) Assignees: SK hynix Inc., Icheon (KR); POSTECH ACADEMY-INDUSTRY FOUNDATION, Pohang (KR)

( * ) Notice: Subject to any disclaimer, the term of this patent is extended or adjusted under 35 U.S.C. 154(b) by 358 days.

(21) Appl. No.: 18/458,896

(22) Filed: Aug. 30, 2023

(65) Prior Publication Data

US 2024/0094704 A1    Mar. 21, 2024

(30) Foreign Application Priority Data

Sep. 15, 2022 (KR) ........................ 10-2022-0116011

(51) Int. Cl.
*G05B 19/40* (2006.01)
*G05B 19/4099* (2006.01)
*H01L 21/66* (2006.01)

(52) U.S. Cl.
CPC .............. *G05B 19/4099* (2013.01); *G05B 2219/45031* (2013.01); *H01L 22/20* (2013.01)

(58) Field of Classification Search
None
See application file for complete search history.

(56) References Cited

U.S. PATENT DOCUMENTS 5,383,136 A * 1/1995 Cresswell .............. H01C 10/06
702/97
5,602,492 A * 2/1997 Cresswell .......... G01R 31/2818
324/716

(Continued)

FOREIGN PATENT DOCUMENTS

CN          114341885 A  *  4/2022  ............. G06N 3/045
KR       1020220049995 A      4/2022

(Continued)

OTHER PUBLICATIONS

Yun et al., "Accurate Prediction and Reliable Parameter Optimization of Neural Network for Semiconductor Process Monitoring and Technology Development", 2023, Adv. Intell. Syst., 5, 2300089 (Year: 2023).*

(Continued)

*Primary Examiner* — Mohammad Ali
*Assistant Examiner* — Kelvin Booker

(57) ABSTRACT

Determining a semiconductor device manufacturing parameter may include determining an EPM (electrical measurement parameters) group that has a correlation in a baseline EPM dataset including EPMs of a device manufactured under a baseline condition, deriving principal components (PCs) corresponding to main correlation axes between EPMs in the EPM group, deriving a PC-based dataset including a baseline PC dataset and a conditional split PC dataset by converting the baseline EPM dataset and a conditional split EPM dataset measured from devices manufactured under conditional splits into a PC domain, determining, using the PC-based dataset, respective PCs which are effectively changed by the conditional splits, obtaining split variation information of the conditional splits, extracting an optimal point capable of optimizing a figure of merit of a semiconductor device within a range of the PC-based (Continued)

dataset, and deriving information for process feedback for realizing the optimal point using the split variation information.

16 Claims, 14 Drawing Sheets

(56) References Cited

U.S. PATENT DOCUMENTS

| | | | | |
|---|---|---|---|---|
| 5,857,258 | A * | 1/1999 | Penzes | G03F 7/70616 |
| | | | | 29/846 |
| 6,774,998 | B1 * | 8/2004 | Wright | G03F 7/70633 |
| | | | | 356/399 |
| 8,214,771 | B2 * | 7/2012 | Adel | G03F 7/706831 |
| | | | | 703/2 |
| 10,522,427 | B2 * | 12/2019 | Chan | H01L 22/20 |
| 11,248,905 | B2 * | 2/2022 | Amit | G06N 99/00 |
| 2004/0018661 | A1 * | 1/2004 | Baek | H01L 25/105 |
| | | | | 438/109 |
| 2006/0012019 | A1 * | 1/2006 | Kang | H01L 23/13 |
| | | | | 257/E23.104 |
| 2008/0281566 | A1 * | 11/2008 | Wang | H01L 22/20 |
| | | | | 703/7 |
| 2010/0256792 | A1 * | 10/2010 | Tian | G05B 19/41865 |
| | | | | 700/104 |
| 2016/0315029 | A1 * | 10/2016 | Lee | H01L 23/367 |
| 2021/0028070 | A1 * | 1/2021 | Volkovich | H01L 22/12 |
| 2021/0366790 | A1 * | 11/2021 | Volkovich | H01L 22/20 |
| 2022/0277189 | A1 * | 9/2022 | Choi | G06N 3/045 |

FOREIGN PATENT DOCUMENTS

| | | | | |
|---|---|---|---|---|
| WO | WO-2019035854 | A1 * | 2/2019 | G03F 7/70683 |
| WO | 2021081213 | A1 | 4/2021 | |
| WO | WO-2022008174 | A1 * | 1/2022 | G03F 7/706837 |

OTHER PUBLICATIONS

Park et al., "Study on Data Preprocessing for Machine Learning Based on Semiconductor Manufacturing Processes", Jun. 2024, Sensors, 2024, 24, 5461. https://doi.org/10.3390/s24175461. (Year: 2024).*

Pimachev et al., "First-principles prediction of electronic transport in fabricated semiconductor heterostructures via physics-aware machine learning", 2021, NPJ Computational Materials (2021) 7:93. (Year: 2021).*

Shenai, K. "The Figure of Merit of a Semiconductor Power Electronics Switch", Oct. 2018, IEEE Transactions on Electron Devices, vol. 65, No. 10. (Year: 2018).*

Chang et al., "Anomaly Detection Using Signal Segmentation and One-Class Classification in Diffusion Process of Semiconductor Manufacturing", Apr. 2021, Sensors 2021, 21, 3880. (Year: 2021).*

* cited by examiner

METHOD AND APPARATUS FOR SETTING SEMICONDUCTOR DEVICE MANUFACTURING PARAMETER

CROSS-REFERENCES TO RELATED APPLICATION

The present application claims the benefit under 35 U.S.C. § 119(a) of Korean application No. 10-2022-0116011, filed on Sep. 15, 2022, which is herein incorporated by reference in its entirety.

BACKGROUND

1. Field

The present invention relates to semiconductor parameter setting technology, and more particularly, to a method and an apparatus for setting semiconductor device manufacturing parameter.

2. Description of the Related Art

In a semiconductor process, due to competition in miniaturization and integration technologies, it is necessary to develop devices at a reduced cost and time and to increase performance and mass production yield. Techniques using machine learning through artificial neural networks have been proposed for reducing cost and time in the development process of semiconductor devices.

However, in an actual semiconductor processing environment, measurement of parameters is sampled to lower processing cost, resulting in missing values, and as a result, an incomplete dataset unsuitable for learning by an artificial neural network may be obtained. In addition, when the data derived through the split of various process conditions has an imbalanced number of samples, artificial neural network learning may lead to inappropriate results that focus on the correlation of data clusters with a large number of samples.

Also, when a process recipe is set based on a certain target value of a semiconductor manufacturing parameter and the process is performed, the data generated as a result of the process inevitably include process variability and random variability which are difficult to control based on the target value. As a result, the input value to be learned by the artificial neural network is one target value of the semiconductor manufacturing parameter set as the process recipe, but the output value becomes a plurality of distribution data including variability in the target value, and thus, there is a problem that one-to-one (1:1) data pairs used in general machine learning may not be obtained.

An electrical parameter measurement (EPM) which reflects the information of the process step may be obtained and used as an input value, but these parameters can have statistical correlations with each other, and the complex correlation between EPMs becomes a factor which makes it impossible to perform sensitivity analysis of EPM and parameter tuning separately and/or independently. In addition, it is inefficient for an expert to perform manual sensitivity analysis and electrical parameter tuning while simultaneously considering the statistical correlation of EPMs in a time-constrained development process.

In addition, even if an optimal combination in the EPM domain (optimal EPM combination) is found in consideration of the statistical correlation between EPMs, there is no specific technology on how to produce the optimal EPM combination in a semiconductor device manufacturing process.

SUMMARY

An object of the present invention is to provide a semiconductor device manufacturing parameter setting method capable of finding, for a semiconductor manufacturing process, an optimal parameter combination capable of optimizing the performance of a semiconductor device produced using the semiconductor manufacturing process, and providing process feedback for implementing the optimal parameter combination in the semiconductor manufacturing process.

In addition, a technical effect to be achieved by the present invention is to provide a semiconductor device manufacturing parameter setting method capable of enhancing the suitability and accuracy of machine learning using an artificial neural network by balancing unbalanced process condition datasets.

In addition, a technical effect to be achieved by the present invention is to provide an apparatus for semiconductor device manufacturing parameter setting capable of performing the semiconductor device manufacturing parameter setting method.

In addition, a technical effect to be achieved by the present invention is to provide a computer program capable of performing the semiconductor device manufacturing parameter setting method.

The problem to be solved by the present invention is not limited to the problems mentioned above, and other problems not mentioned will be understood by those skilled in the art from the description below.

According to an embodiment of the present invention, there is provided a method for setting semiconductor device manufacturing parameters comprising: deriving a plurality of PCs (principal components) corresponding to main correlation axes between EPMs (electrical measurement parameters) in the following EPM group by obtaining a baseline EPM dataset including a plurality of EPMs measured from a baseline semiconductor device manufactured under a baseline condition corresponding to a basic experimental condition for setting semiconductor device manufacturing parameters, setting the EPM group having a correlation in the baseline EPM dataset, and performing data component analysis on the EPM group; deriving a PC-based dataset including a conditional split PC dataset and a baseline PC dataset by converting a conditional split EPM dataset including a plurality of EPMs measured from each of a plurality of conditional split semiconductor devices manufactured under a plurality of conditional splits having conditions changed from the baseline condition, and the baseline EPM dataset into a PC domain corresponding to the plurality of PCs derived by the data component analysis applied to the baseline EPM dataset; determining a PC which is effectively changed by each of the plurality of conditional splits through data processing on the PC-based dataset, and obtaining split variation information caused by each of the plurality of conditional splits; extracting an optimal point capable of optimizing a figure of merit (FOM) of a semiconductor device within a range of the PC-based dataset; and deriving information for process feedback for realizing the optimal point by using the split variation information.

The determining a PC which is effectively changed by each of the plurality of conditional splits through the data processing of the PC-based dataset may include performing data clustering on the PC-based dataset, calculating accuracy of conditional split label classification according to the conditional split, and deriving a PC whose accuracy is greater than or equal to a threshold value.

The determining a PC which is effectively changed by each of the plurality of conditional splits through the data processing for the PC-based dataset may include calculating a variance inflation factor (VIF) and an explained variance (EV) for the PC-based dataset and deriving a PC combination having the VIF equal to or greater than a threshold value or a PC having the EV which is increased to equal to or greater than a threshold level.

The deriving information for process feedback for realizing the optimal point by using the split variation information may be configured to be performed using the following equation.

$$\text{Optimal } PCs - \text{Median } PCs = c_1 \cdot S_1 + c_2 \cdot S_2 + \ldots + c_n \cdot S_n, \quad \langle\text{Equation}\rangle$$

$$S_i = \begin{pmatrix} i_1 \cdot \vec{z_1} \\ i_2 \cdot \vec{z_2} \\ \vdots \\ i_m \cdot \vec{z_m} \end{pmatrix}$$

Here, the Optimal PCs is an optimized PC combination including a plurality of PCs corresponding to the optimal point, the Median PCs is a baseline PC combination including a plurality of PCs corresponding to the baseline, the $S_1$, $S_2$ and $S_n$ are split variation vectors caused by each of the plurality of conditional splits, and the $c_1$, $c_2$ and $c_n$ are constants. The split variation vector $S_i$ includes effective PC vectors $(z_1, z_2, \ldots, z_m)$ which are changed from the baseline PC combination due to the conditional split, and the $i_1$, $i_2$ and $i_m$ are constants.

The method for semiconductor device manufacturing parameter setting may further include performing data correction through oversampling and/or undersampling on at least one of the baseline EPM dataset and the conditional split EPM dataset to correct an imbalance in amount of data between the baseline EPM dataset and the conditional split EPM dataset.

The performing data correction may be performed between the deriving the plurality of PCs and the deriving the PC-based dataset.

The extracting the optimal point may be performed using an artificial neural network.

According to another embodiment of the present invention, there is provided an apparatus for setting semiconductor device manufacturing parameters comprising: a pre-processing module and an analysis module, wherein the pre-processing module is configured to set an EPM (electrical measurement parameter) group that has a correlation in a baseline EPM dataset including a plurality of EPMs measured from a baseline semiconductor device manufactured under a baseline condition corresponding to a basic experimental condition for setting semiconductor device manufacturing parameters, to derive a plurality of principal components (PCs) corresponding to main correlation axes between EPMs in the EPM group by performing data component analysis on the EPM group, and to derive a PC-based dataset including a conditional split PC dataset and a baseline PC dataset by converting a conditional split EPM dataset including a plurality of EPMs measured from each of a plurality of conditional split semiconductor devices manufactured under a plurality of conditional splits having the conditions changed from the baseline condition, and the baseline EPM dataset into to a PC domain corresponding to the plurality of PCs derived by the data component analysis applied to the baseline EPM dataset; and wherein the analysis module is configured to determine a PC which is effectively changed by each of the plurality of conditional splits through data processing on the PC-based dataset, obtain split variation information caused by each of the plurality of conditional splits, to extract an optimal point capable of optimizing a figure of merit (FOM) of a semiconductor device within a range of the PC-based dataset, and to derive information for process feedback for implementing the optimal point using the split variation information.

The analysis module may be configured to perform data clustering on the PC-based dataset, calculate accuracy of conditional split label classification according to the conditional split, and derive a PC whose accuracy is greater than or equal to a threshold value in order to determine a PC which is effectively changed by each of the plurality of conditional splits through the data processing on the PC-based dataset.

The analysis module may be configured to calculate a variance inflation factor (VIF) and an explained variance (EV) for the PC-based dataset to derive a PC combination in which the VIF is greater than or equal to a threshold value or a PC in which the EV is increased to a threshold level or more in order to determine a PC which is effectively changed by each of the plurality of conditional splits through the data processing on the PC-based dataset.

The analysis module may be configured to perform an operation according to the following equation in order to derive the information for process feedback for implementing the optimal point by using the split variation information.

$$\text{Optimal } PCs - \text{Median } PCs = c_1 \cdot S_1 + c_2 \cdot S_2 + \ldots + c_n \cdot S_n, \quad \langle\text{Equation}\rangle$$

$$S_i = \begin{pmatrix} i_1 \cdot \vec{z_1} \\ i_2 \cdot \vec{z_2} \\ \vdots \\ i_m \cdot \vec{z_m} \end{pmatrix}$$

Here, the Optimal PCs is an optimized PC combination including a plurality of PCs corresponding to the optimal point, the Median PCs is a baseline PC combination including a plurality of PCs corresponding to the baseline, the $S_1$, $S_2$ and $S_n$ are split variation vectors caused by each of the plurality of conditional splits, and the $c_1$, $c_2$ and $c_n$ are constants. The split variation vector $S_i$ includes effective PC vectors $(z_1, z_2, \ldots, z_m)$ that are changed from the baseline PC combination due to the conditional split, and the $i_1$, $i_2$ and $i_m$ are constants.

The pre-processing module may be configured to perform data correction through oversampling and/or oversampling of at least one of the baseline EPM dataset and the conditional split EPM dataset to correct an imbalance in amount of data between the baseline EPM dataset and the conditional split EPM dataset.

The pre-processing module may be configured to perform the data correction between the deriving of the plurality of PCs and the deriving of the PC-based dataset.

The analysis module may be configured to extract the optimal point using an artificial neural network.

The apparatus for semiconductor device manufacturing parameter setting may further include a prediction module that predicts the figure of merit (FOM) of the semiconductor device using an artificial neural network based on the PC-based dataset.

According to another embodiment of the present invention, there is provided a computer program stored in a computer readable storage medium, the computer program including one or more instructions, the one or more instructions, when executed by a computing device having one or more processors, causes the computing device to: set an EPM (electrical measurement parameter) group that has a correlation in a baseline EPM dataset including a plurality of EPMs measured from a baseline semiconductor device manufactured under a baseline condition corresponding to a basic experimental condition for setting semiconductor device manufacturing parameters, and derive a plurality of principal components (PCs) corresponding to main correlation axes between EPMs in the EPM group by performing data component analysis on the EPM group; derive a PC-based dataset including a conditional split PC dataset and a baseline PC dataset by converting a conditional split EPM dataset including a plurality of EPMs measured from each of a plurality of conditional split semiconductor devices manufactured under a plurality of conditional splits having the conditions changed from the baseline condition, and the baseline EPM dataset into to a PC domain corresponding to the plurality of PCs derived by the data component analysis applied to the baseline EPM dataset; determine a PC which is effectively changed by each of the plurality of conditional splits through data processing on the PC-based dataset, and obtain split variation information caused by each of the plurality of conditional splits; extract an optimal point capable of optimizing a figure of merit (FOM) of a semiconductor device within a range of the PC-based dataset; and derive information for process feedback for implementing the optimal point using the split variation information.

According to embodiments of the present invention, it is possible to implement a method and an apparatus for setting semiconductor device manufacturing parameters, which may find an optimal parameter combination (e.g., optimal EPM combination) capable of optimizing the performance of a semiconductor device, and may provide a process feedback capable of implementing the optimal parameter combination in an actual semiconductor device process. In particular, according to the embodiments of the present invention, a main correlation axis is derived by considering the statistical correlation inherent in EPMs, and it is possible to more accurately specify the target of the independent variables performing optimization through correlation matching between process condition splits and the main correlation axis between EPMs. In addition, it is possible to provide a specific process feedback on how the derived optimal parameter combination (e.g., optimal EPM combination) can be implemented through a change in one or more process conditions.

In addition, according to embodiments of the present invention, it is possible to implement a method and an apparatus for semiconductor device manufacturing parameter setting which are capable of enhancing the suitability and accuracy of machine learning using an artificial neural network by balancing unbalanced process condition datasets in semiconductor device manufacturing parameter setting.

However, the effects of the present invention are not limited to the above effects, and can be variously extended without departing from the technical spirit and scope of the present invention.

DETAILED DESCRIPTION

Hereinafter, embodiments of the present invention will be described in detail with reference to the accompanying drawings.

The embodiments of the present invention to be described below are provided to more clearly explain the present invention to those skilled in the art, and the scope of the present invention is not limited by the following embodiments, and the embodiments may be modified in many different forms.

The terms used in this specification are used to describe specific embodiments and are not intended to limit the present invention. The terms indicating a singular form used herein may include plural forms unless the context clearly indicates otherwise. Also, as used herein, the terms, "comprise" and/or "comprising" specify the presence of the stated shape, step, number, operation, member, element, and/or group thereof and does not exclude the presence or addition of one or more other shapes, steps, numbers, operations, elements, elements and/or groups thereof. In addition, the term, "connection" used in this specification means not only a direct connection of certain members, but also a concept including an indirect connection in which other members are interposed between the members.

In addition, in the present specification, when a member is said to be located "on" another member, this arrangement includes not only a case in which a member is in contact with another member, but also a case where another member exists between the two members. As used herein, the term, "and/or" includes any one and all combinations of one or more of the listed items. In addition, the terms of degree such as "about" and "substantially" used in the present specification are used as a range of values or degrees, or as a meaning close thereto, taking into account inherent manufacturing and material tolerances, and exact or absolute figures provided to aid in the understanding of this application are used to prevent the infringers from unfairly exploiting the stated disclosure.

Hereinafter, the embodiments of the present invention will be described in detail with reference to the accompanying drawings. A size or a thickness of areas or parts shown in the accompanying drawings may be slightly exaggerated for clarity of the specification and convenience of description. The same reference numbers indicate the same configuring elements throughout the detailed description.

Figure 1:
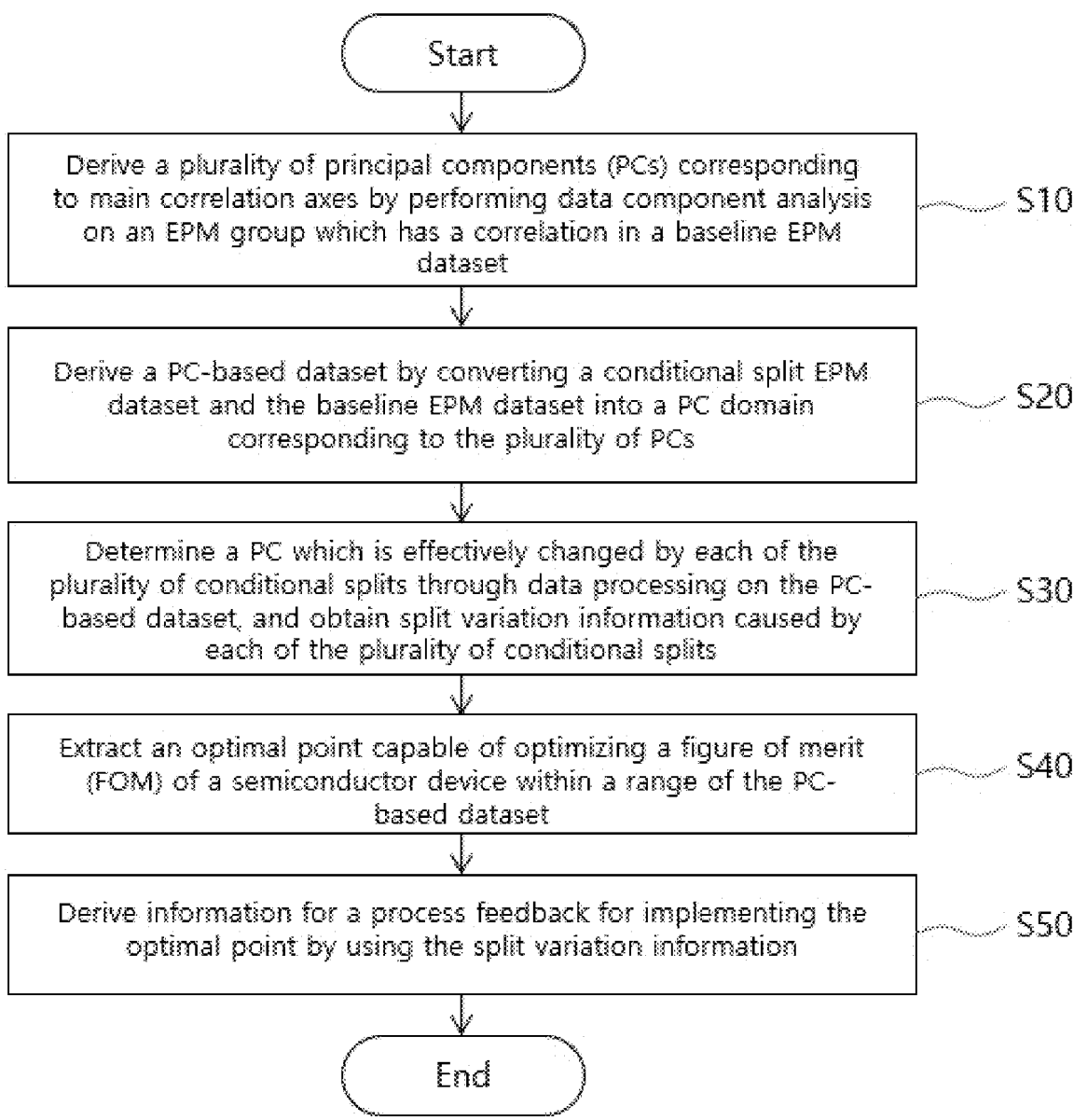
FIG. 1 is a flowchart of a process for setting a semiconductor device manufacturing parameter according to an embodiment of the present invention.

FIG. 1 is a flowchart illustrating a process for setting semiconductor device manufacturing parameter according to an embodiment of the present invention.

Referring to FIG. 1, a process for setting a semiconductor device manufacturing parameter according to an embodiment of the present invention may include a step S10 for obtaining a baseline EPM dataset including a plurality of electrical measurement parameters (EPMs) measured from a baseline semiconductor device manufactured under a baseline condition corresponding to a basic experimental condition for setting semiconductor device manufacturing parameters, determining an EPM group which has a correlation in the baseline EPM dataset, and deriving a plurality of principal components (PCs) corresponding to main (major) correlation axes (effective correlation axes) between EPMs in the EPM group by performing data component analysis on the EPM group; a step S20 for deriving a PC-based dataset including a baseline PC dataset and a conditional split PC dataset by converting the baseline EPM dataset and a conditional split EPM dataset including a plurality of EPMs measured from each of a plurality of conditional split semiconductor devices manufactured by a plurality of conditional splits having conditions changed from the baseline condition into a PC domain corresponding to the plurality of PCs derived by the data component analysis applied to the baseline EPM dataset; a step S30 for determining, through data processing of the PC-based dataset, a PC which is effectively changed by each of the plurality of conditional splits, and obtaining split variation information caused by each of the plurality of conditional splits; a step S40 for extracting an optimal point capable of optimizing a figure of merit (FOM) of a semiconductor device within a range of the PC-based dataset; and a step S50 for deriving information for a process feedback for implementing (realizing) the optimal point by using the split variation information.

In step S10, the baseline condition may be set to a process condition which is generally determined to exhibit excellent characteristics. Here, the process condition is one or more manufacturing parameters of a semiconductor device and may include a design parameter used to manufacture a semiconductor device having a specific structure. For example, when the semiconductor device includes a transistor, the process conditions (the manufacturing parameters) may include a gate length, a gate insulator thickness, a doping concentration, a junction gradient, a gate stack height, and the like, or combinations thereof.

After manufacturing the baseline semiconductor device under the baseline condition, a plurality of electrical measurement parameters (EPMs) may be measured therefrom. An EPM may be a parameter value electrically measured from a manufactured semiconductor device. For example, when the semiconductor device includes a transistor, the EPM may be a breakdown voltage (BV), an electrical critical dimension (ECD), an effective oxide thickness (EOT), drain saturation current (Idsat), off-current (Idoff), or the like. Even under a single process condition, EPM data can be derived as distribution data due to process variability and random variability.

In step S10, an EPM group having a correlation in the baseline EPM dataset may be set. In other words, EPMs having cross-correlation in the baseline EPM dataset may be classified into a plurality of groups. The correlation may be a statistical correlation. Also, the correlation may exhibit multicollinearity. EPMs can have statistical correlations. For example, in the EPMs, the drain saturation current Idsat and the off-current Idoff may have a positive correlation. For other examples, the effective oxide thickness (EOT) and the breakdown voltage (BV) may have a positive correlation, and the poly depletion ratio and the inversion capacitance may have a positive correlation. In addition, there are various other EPMs having a statistical correlation.

In step S10, for example, EPMs may be grouped based on a variance inflation factor (VIF). VIFs between the EPMs obtained in step S10 may be calculated, and EPMs having a VIF value equal to or greater than a preset threshold value may be classified into a group having a correlation. Here, VIF is an index which describes how precisely a value of a variable parameter is determined by another variable parameter. In step S10, a variance inflation index (VIE) between the i-th specific EPM and other EPMs in the group can be calculated through Equation 1 below.

$$VIF_i = \frac{1}{1 - R_i^2} \quad \text{[Equation 1]}$$

In Equation 1, $R_i^2$ is a determination coefficient (regression coefficient) between the i-th EPM and other EPMs in the corresponding group.

In step S10, an EPM group having a correlation between its members is determined in the baseline EPM dataset, and a data component analysis is performed on the EPM group so that a plurality of PCs (principal components) corresponding to the main correlation axis between the EPMs in the EPM group can be derived. The data component analysis may be any one selected from the group consisting of PCA (principal component analysis), inverse NLPCA (non-linear principal component analysis), SOM (self-organizing map), ICA (independent component analysis), and the like. A plurality of PCs (principal components) corresponding to the main correlation axes between EPMs in an EPM group having a correlation may be extracted through the data component analysis. The plurality of PCs may be main correlation axes between EPMs which can be obtained through PCA, inverse NLPCA, SOM, ICA, and the like. The process for extracting the plurality of PCs will be described in detail with reference to FIGS. 4 and 5 in the following paragraphs.

In step S10, the main correlation axis may be determined in consideration of an explained variance (EV) value. In this regard, step S10 may calculate an EV value for a correlation axis between extracted EPMs for each EPM group. Here, the EV for an extracted correlation axis is a proportion of the total variance of the EPMs which can be attributed to the variance of that extracted correlation axis. For example, when the total variance of the data source is var (X) and the variance of the i-th correlation axis extracted from the data is var ($X_i$), the $EV_i$ (explained variance) of the i-th correlation axis is the following equation can be represented by Equation 2.

$$EV_i = \frac{\text{var}(X_i)}{\text{var}(X)} \quad \text{[Equation 2]}$$

In step S10, among the correlation axes extracted for each EPM group, a correlation axis having an EV value equal to or greater than a predetermined threshold value may be set as the main correlation axis (effective correlation axis).

In step S20, a PC-based dataset including a conditional split PC dataset and a baseline PC dataset can be derived (obtained) by converting a conditional split EPM dataset and the baseline EPM dataset into a PC domain corresponding to the plurality of PCs derived by the data component analysis applied to the baseline EPM dataset. The conditional split EPM dataset includes a plurality of EPMs measured from each of a plurality of conditional split semiconductor devices manufactured in a plurality of conditional splits having conditions changed from the baseline conditions. In other words, the conditional split EPM dataset and the baseline EPM dataset may be converted into a PC domain based on the plurality of PCs obtained from the baseline EPM dataset. Such a data conversion will be described in more detail later with reference to FIGS. 6 to 8.

The conditional split (condition split) refers to process conditions changed from the baseline condition. In order to set semiconductor device manufacturing parameters, a plurality of conditional split semiconductor devices may be manufactured while changing process conditions, and a plurality of conditional split EPM datasets may be obtained by measuring a plurality of EPMs from each of the plurality of conditional split semiconductor devices. If necessary, an EPM group having a correlation may be set in the conditional split EPM dataset. In other words, even in the conditional split EPM dataset, EPMs having mutual correlations may be classified into a plurality of groups.

In step S30, a PC which is effectively (significantly) changed by each of the plurality of conditional splits (i.e., a major PC or an effective PC) may be determined through data processing on the PC-based dataset including the baseline PC dataset and the conditional split PC dataset, and split variation information by each of the plurality of conditional splits may be obtained.

Since the PC-based dataset is a dataset in which the correlation between EPMs is removed from the EPM dataset (the baseline EPM dataset and the conditional split EPM dataset), if the PC-based dataset is used, independent and/or single analysis may be possible for each of the EPMs. The PC-based dataset is obtained by converting the EPM dataset based on the PC domain, and can be said to be composed of converted EPM data. Therefore, the PC-based dataset is not data corresponding to process condition parameters, but can be referred to as EPM-based data.

In step S30, through data processing on the PC-based dataset, it is possible to determine, respectively, a PC (i.e., a major PC or an effective PC) which is significantly (meaningfully) changed by each of the plurality of conditional splits, and split variation information according to each of the plurality of conditional splits may be obtained by using information on the PC which is effectively (significantly) changed by that conditional split. Here, the split variation information may be information about in which direction and by how much specific PCs are moved from reference points corresponding to the baseline condition by a corresponding condition split. It is possible to derive information for process feedback for realizing an 'optimal point' later by obtaining and using the split variation information.

Additionally, step S30 may further include a step for determining an EPM (a major EPM or an effective EPM) which is effectively (significantly) changed by each of the plurality of conditional splits through data processing on an EPM-based dataset including the baseline EPM dataset and the conditional split EPM dataset. In other words, step S30 may include a step for determining the EPM and PC which are effectively (significantly) changed by each of the plurality of conditional splits through data processing for an EPM-based dataset including the baseline EPM dataset and the conditional split EPM dataset, and for a PC-based dataset including the baseline PC dataset and the conditional split PC dataset, respectively. The information on the EPM (i.e., major EPM or effective EPM) which is effectively (significantly) changed by the corresponding conditional split can be used for various analyses.

In step S40, an optimal point capable of optimizing a figure of merit (FOM) of a semiconductor device may be extracted within a range of the PC-based dataset. Here, the figure of merit (FOM) of the semiconductor device may include, for example, one or more selected from power delay product (PDP), frequency, ring oscillator delay (ROD), power dissipation, IR drop, and the like. In step S40, the extraction of the optimal point may be performed by using an artificial neural network. An artificial neural network may be used to analyze the sensitivity of each performance metric based on the values of the main correlation axes described in the above paragraphs, and an optimal parameter (i.e., the optimal point) may be derived. Since the technique itself for deriving the optimal point may correspond to a machine learning technique using a well-known artificial neural network, a detailed description thereof will be omitted.

Step S40 may further include a step for predicting a figure of merit (FOM) of the semiconductor device by using an artificial neural network based on the PC-based dataset before extracting the optimal point. In this case, an artificial neural network having data of the PC-based dataset (i.e., converted EPM data) as an input value and a predetermined figure of merit (FOM) of a semiconductor device as an output value may be used. In other words, it is possible to predict the figure of merit (FOM) through the artificial neural network by using the EPM (i.e., the converted EPM) as an input value based on the values of the main correlation axes. This will be described in more detail with reference to FIG. 10 in the following paragraphs.

In step S50, information for process feedback for realizing the optimal point may be derived by using the split variation information. In step S50, information (or corresponding information) on which conditional splits are to be combined in which way to implement the optimal point may be obtained, and the information may be provided as process feedback information (provided to developers or engineers). A process for deriving information for the process feedback will be described in more detail with reference to FIG. 12 in the following paragraphs.

Figure 2:
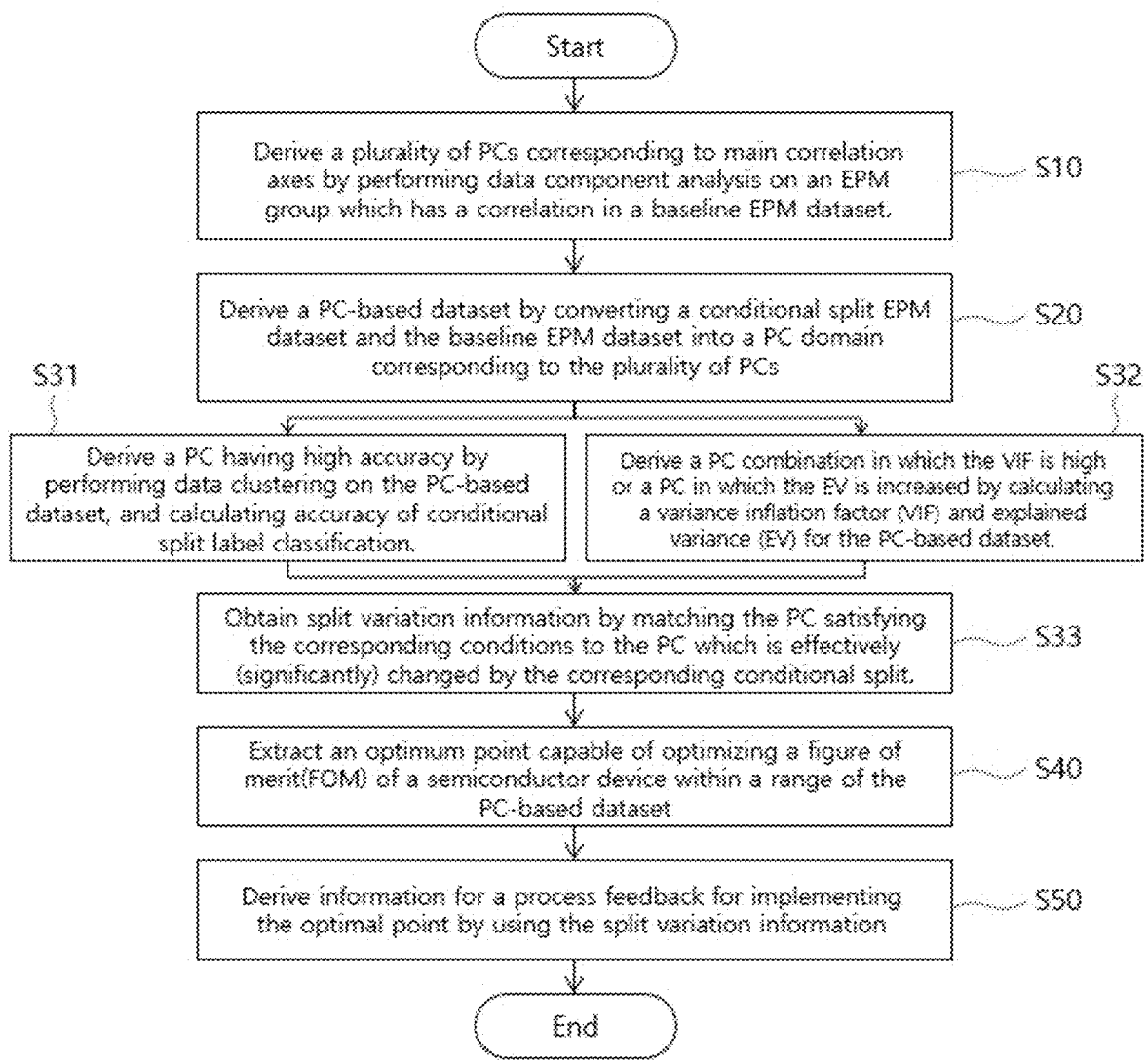
FIG. 2 is a flowchart of a process for setting a semiconductor device manufacturing parameter according to another embodiment of the present invention.

Step S30 in FIG. 1 may be subdivided as shown in FIG. 2. FIG. 2 is a flowchart illustrating a process for setting semiconductor device manufacturing parameter according to another embodiment of the present invention.

Referring to FIG. 2, the process for setting semiconductor device manufacturing parameter according to the present embodiment may include steps S10, S20, S40, and S50 of the process for setting semiconductor device manufacturing parameter described in FIG. 1. Step S30 described in FIG. 1 may include steps S31, S32, and S33 in FIG. 2. Hereinafter, steps S31, S32, and S33 of FIG. 2 will be mainly described.

The step for determining a PC which is effectively changed by each of the plurality of conditional splits through the data processing of the PC-based dataset may include a step S31 for deriving a PC whose accuracy is greater than or equal to a threshold value by performing data clustering on the PC-based dataset and calculating the accuracy (accuracy of classification according to clustering) of conditional split label classification according to the conditional split. At this time, clustering may be performed on PC pairs in the PC-based dataset, and PCs with high accuracy may be derived by calculating the accuracy of conditional split label classification. Here, the accuracy may be a concept encompassing precision and recall. It is possible to extract PCs that are effectively (significantly) changed by corresponding conditional splits through step S31.

In addition, the step for determining a PC which is effectively changed by each of the plurality of conditional splits through the data processing for the PC-based dataset may include a step S32 for calculating a variance inflation factor (VIF) and explained variance (EV) for the PC-based dataset to derive a PC combination having the VIF equal to or greater than a threshold value and/or a PC having the EV which is equal to or greater than a threshold level. It is possible to extract PCs which are relatively (or mainly) effectively (significantly) changed by the corresponding conditional split through step S32.

After performing steps S31 and S32, the PC (or the plurality of PCs) satisfying the conditions of steps S31 and S32 may be matched as the PC (or the plurality of PCs) which are effectively (significantly) changed by the conditional split, and it is possible to obtain the split variation information generated by each of the plurality of conditional splits. Step S32 may be performed in parallel (simultaneously) with step S31, but may be performed after step S31 or before step S31, depending on circumstances. Also, in some cases, step S32 may be omitted.

Additionally, in step S31, data clustering may be performed on the EPM-based dataset including the baseline EPM dataset and the conditional split EPM dataset, and the accuracy of conditional split label classification (accuracy of classification according to the clustering) according to the conditional split may be calculated to derive an EPM having the accuracy equal to or greater than a threshold value. In this case, clustering of EPM pairs may be performed in the EPM-based dataset, and an EPM with high accuracy may be derived by calculating accuracy of conditional split label classification. Through this process, it is possible to extract the EPM which is effectively (significantly) changed by the corresponding conditional split. In this case, in step S33, an EPM (or a plurality of EPMs) satisfying the condition of step S31 may be matched as an EPM (or a plurality of EPMs) which are effectively (significantly) changed by the corresponding conditional split. Therefore, in step S33, the PC and EPM satisfying the conditions of steps S31 and S32 may be matched as the PC and EPM which are effectively (significantly) changed by the conditional split. The above clustering may be performed for both of EPM$_i$ and EPM$_j$ (i≠j, i, j∈E, E is the EPM dimension), and PC$_k$ and PC$_1$ (k≠k, 1∈P, P is the PC dimension).

Figure 3:
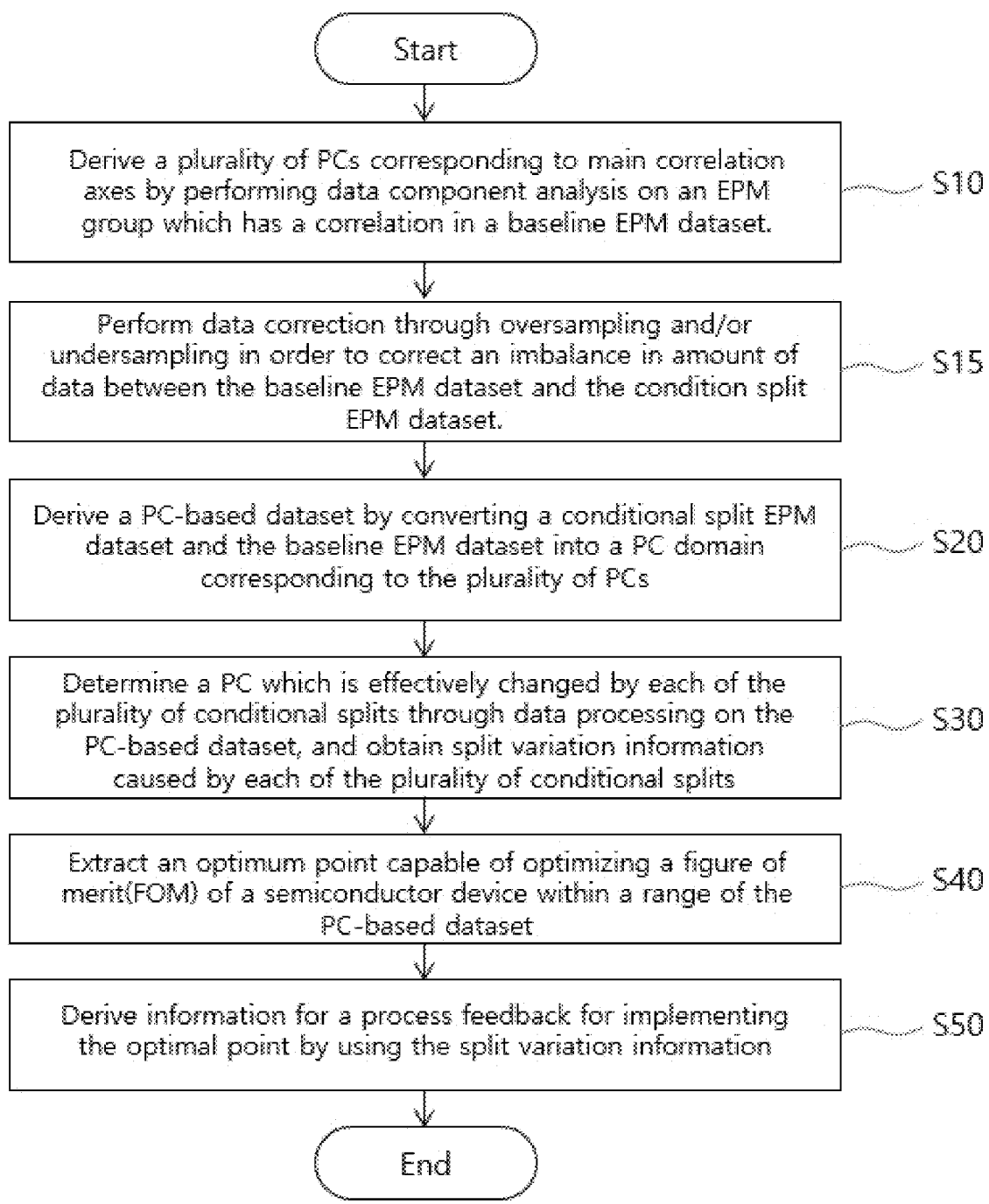
FIG. 3 is a flowchart of a process for setting semiconductor device manufacturing parameter according to another embodiment of the present invention.

FIG. 3 is a flowchart illustrating a process for setting semiconductor device manufacturing parameter according to another embodiment of the present invention.

Referring to FIG. 3, the process for setting semiconductor device manufacturing parameter according to the present embodiment may include steps S10, S20, S30, S40, and S50 of the process for setting semiconductor device manufacturing parameter described in FIG. 1. Additionally, the process for setting the semiconductor device manufacturing parameter of FIG. 3 may further include a step S15 for performing data correction through oversampling and/or undersampling of at least one of the EPM dataset and the conditional split EPM dataset in order to correct an imbalance in an amount (number) of data between the baseline EPM dataset and the conditional split EPM dataset. The data correction step S15 may be performed, for example, between the step (i.e., S10) of deriving the plurality of PCs and the step (i.e., S20) of deriving the PC-based dataset. In this case, it may be advantageous to more effectively derive the plurality of PCs, and also to derive a PC-based dataset having a form more suitable for application to an artificial neural network through the data correction (oversampling and/or undersampling) performed in step S15. However, depending on the case, the application time of step S15 may be different. For example, if necessary, step S15 may be performed before step S10 (i.e., the step for deriving a plurality of PCs).

In step S15, undersampling may be performed on the baseline EPM dataset and/or oversampling may be performed on the conditional split EPM dataset. The oversampling may include a generation process through combining existing data. In addition, in step S15, oversampling and/or undersampling may be performed on at least one of a plurality of conditional split EPM datasets. In connection with the oversampling and the undersampling, a generally well-known technique may be used. For example, a synthetic minority oversampling technique (SMOTE) may be used as the oversampling technique, but a specific technique may be variously changed.

In the embodiment of the present invention, at least the data amount imbalance between the baseline EPM dataset and the conditional split EPM dataset is corrected by using the data correction step (S15), thereby improving the accuracy of the parameter setting performed using machine learning through artificial neural networks.

Figure 4:
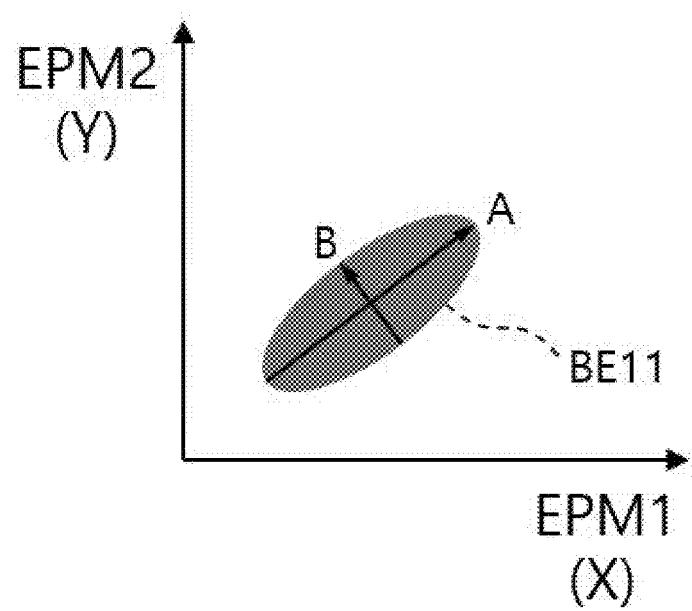
FIG. 4 is a graph illustrating derivation of a plurality of PCs (principal components) corresponding to main correlation axes between EPMs in a baseline EPM dataset in a process for setting semiconductor device manufacturing parameter according to an embodiment of the present invention.

FIG. 4 is a graph for explaining a process for deriving a plurality of PCs (principal components) corresponding to main/major correlation axes between EPMs in a baseline EPM dataset in a process for setting semiconductor device manufacturing parameter according to an embodiment of the present invention.

Referring to FIG. 4, the graph shows a data distribution BE11 between EPM1 (a first electrical measurement parameter) and EPM2 (a second electrical measurement parameter) having a mutual statistical correlation. This data distribution BE11 can be referred to as a kind of 'baseline EPM dataset BE11'. The baseline EPM dataset BE11 may be shown on the EPM domain. It can be seen that EPM1 and EPM2 have a positive correlation. Therefore, when EPM1 is changed along the X-axis which is a general reference axis, EPM2 tends to change along the Y-axis which is another reference axis, and vice versa. In this way, as one of EPM1 and EPM2 is changed, the other one also tends to be changed. Thus, EPM1 and EPM2 cannot be independently analyzed.

According to an embodiment of the present invention, data component analysis is performed on the EPM groups (for example, EPM1 and EPM2) in the baseline EPM dataset BE11, and as a result of it, a plurality of PCs (principal components) corresponding to the main correlation axes between the EPMs (EPM1 and EPM2) can be extracted. A-axis and B-axis shown in FIG. 4 may correspond to the main correlation axis. Accordingly, A-axis and B-axis may correspond to the plurality of PCs. In FIG. 4, the A-axis may be a 45° axis and the B-axis may be a 135° axis perpendicular to the A-axis, according to the correlation between EPM1 and EPM2. Since the correlation between the EPMs (EPM1, EPM2) can be removed if the baseline EPM dataset BE11 is converted to the PC domain based on the A-axis and B-axis, EPM1 and EPM2 may be independently analyzed.

Figure 5:
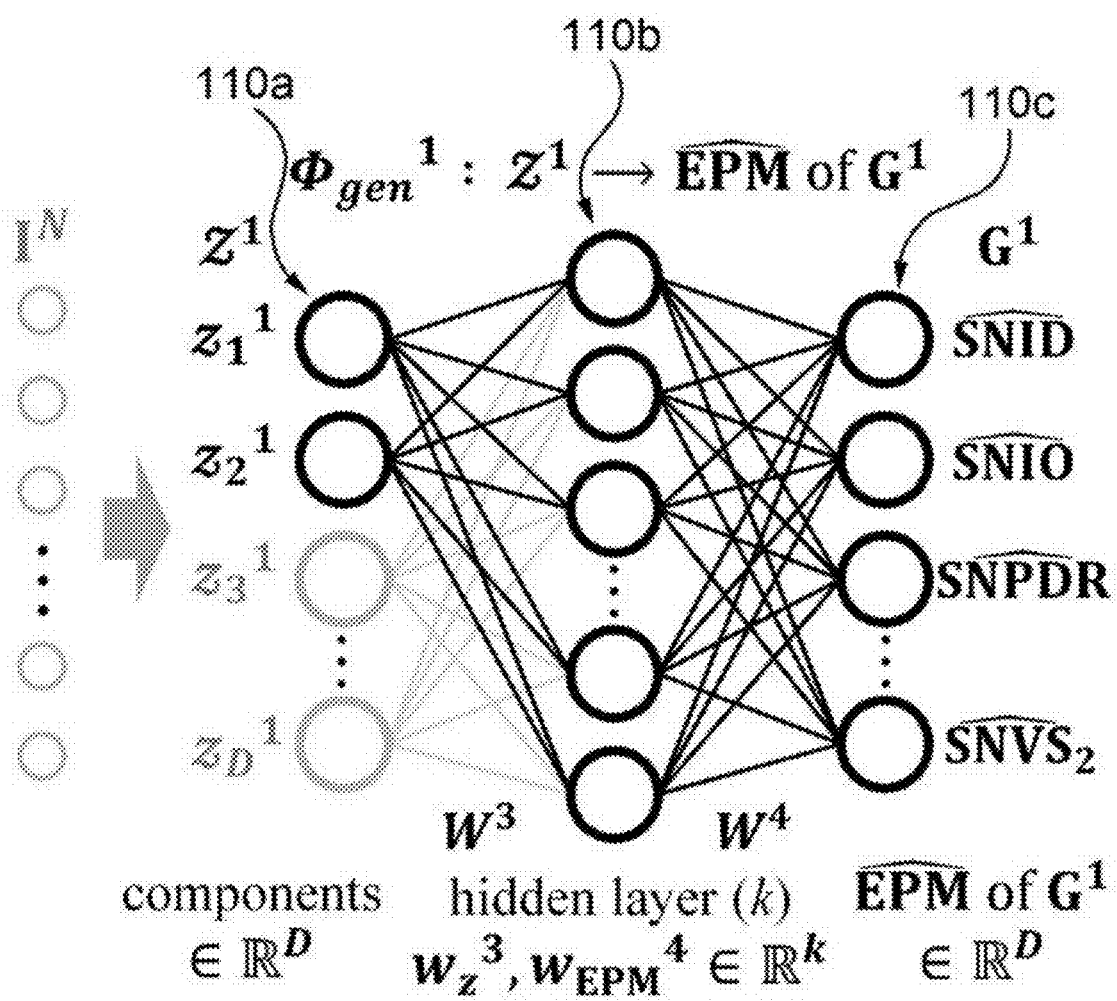
FIG. 5 illustrates a process for extracting a correlation axis between EPMs from an EPM dataset by using inverse NLPCA (non-linear principal component analysis) in a process for setting semiconductor device manufacturing parameter according to an embodiment of the present invention.

FIG. 5 is a diagram for explaining a process for extracting a correlation axis between EPMs from an EPM dataset by using inverse NLPCA (non-linear principal component analysis) in a process for setting semiconductor device manufacturing parameter according to an embodiment of the present invention.

Referring to FIG. 5, the inverse NLPCA model 110 may include an input layer 110a, a hidden layer 110b, and an output layer 110c. Here, when electrical measurement parameters (SNID, SNIO, SNPDR, . . . , SNVS$_2$) belonging to group 1 (G1) are placed on the output layer 110c, the inverse NLPCA model 110 extracts the coordinates $(z_1^1, z_2^1, z_3^1, \ldots z_D^{1)})$ [where D may be the number of electrical measurement parameters belonging to the group 1 (G1)] of the correlation axes among the electrical measurement parameters (SNID, SNIO, SNPDR, . . . , SNVS$_2$) belonging to group 1 (G1) in the input layer 110a through the hidden layer 110b. Here, the coordinates $(z_1^1, z_2^1, z_3^1, \ldots, z_D^1)$ of the correlation axes may be expressed as vectors along the axis direction. Since the inverse NLPCA model 110 may be a known artificial neural network model, a detailed description thereof will be omitted.

Here, the use of the inverse NLPCA model 110 has been described as an example, but the embodiment of the present invention may extract correlation axes by using the other techniques such as PCA (principal component analysis), SOM (self-organizing map), ICA (independent component analysis), etc. other than the inverse NLPCA technique. In addition, in an embodiment of the present invention, correlation axes may be extracted by using a simple calculation technique known in the art without using an artificial neural network.

Figure 6:
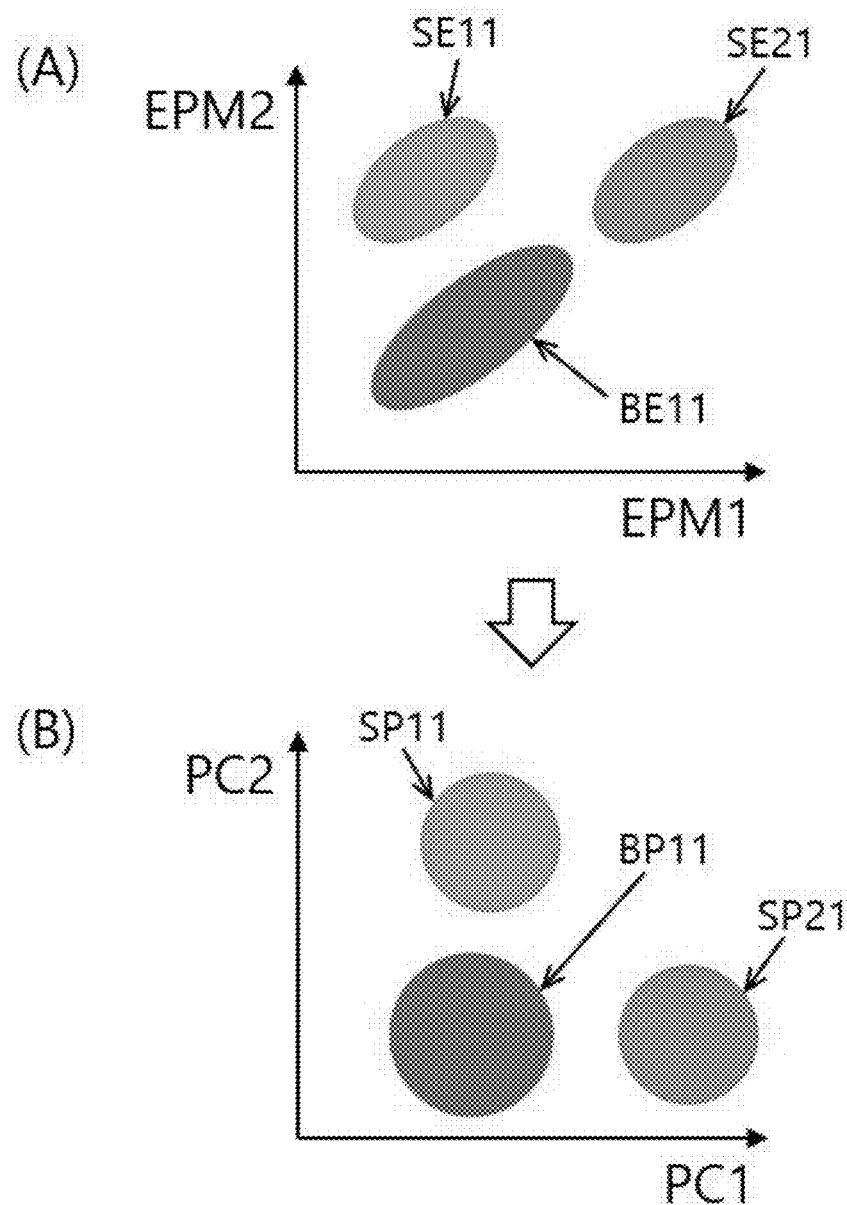
FIG. 6 illustrates a process for deriving a PC-based dataset including a baseline PC dataset and a conditional split PC dataset by converting a baseline EPM dataset and a conditional split EPM dataset into a PC domain corresponding to a plurality PCs extracted from the baseline EPM dataset, in a process for setting semiconductor device manufacturing parameter according to an embodiment of the present invention.

FIG. 6 is a diagram illustrating a process for deriving the PC-based datasets including a baseline PC dataset BP11 and conditional split PC datasets SP11, SP21 by converting a baseline EPM dataset BE11 and conditional split EPM datasets SE11, SE21 to a PC domain corresponding to a plurality PCs (e.g., A-axis and B-axis of FIG. 4) extracted from the baseline EPM dataset BE11, in the process for setting semiconductor device manufacturing parameter according to an embodiment of the present invention.

Referring to FIG. 6, the baseline PC dataset BP11, the first conditional split PC dataset SP11, and the second conditional split PC dataset SP21 may be obtained as illustrated in the graph (B) by converting the baseline EPM dataset BE11, the first conditional split EPM dataset SE11, and the second conditional split EPM dataset SE21 in the graph (A) into the PC domain. It can be seen that there is no correlation between PC1 and PC2 in the PC-based dataset of the graph (B). Here, PC1 may correspond to A-axis of FIG. 4, and PC2 may correspond to B-axis of FIG. 4. There is no correlation between PC1 and PC2 in each of BP11, SP11 and SP21, and therefore, it may be possible to analyze each of the EPMs independently in these PC-based datasets.

Figure 7:
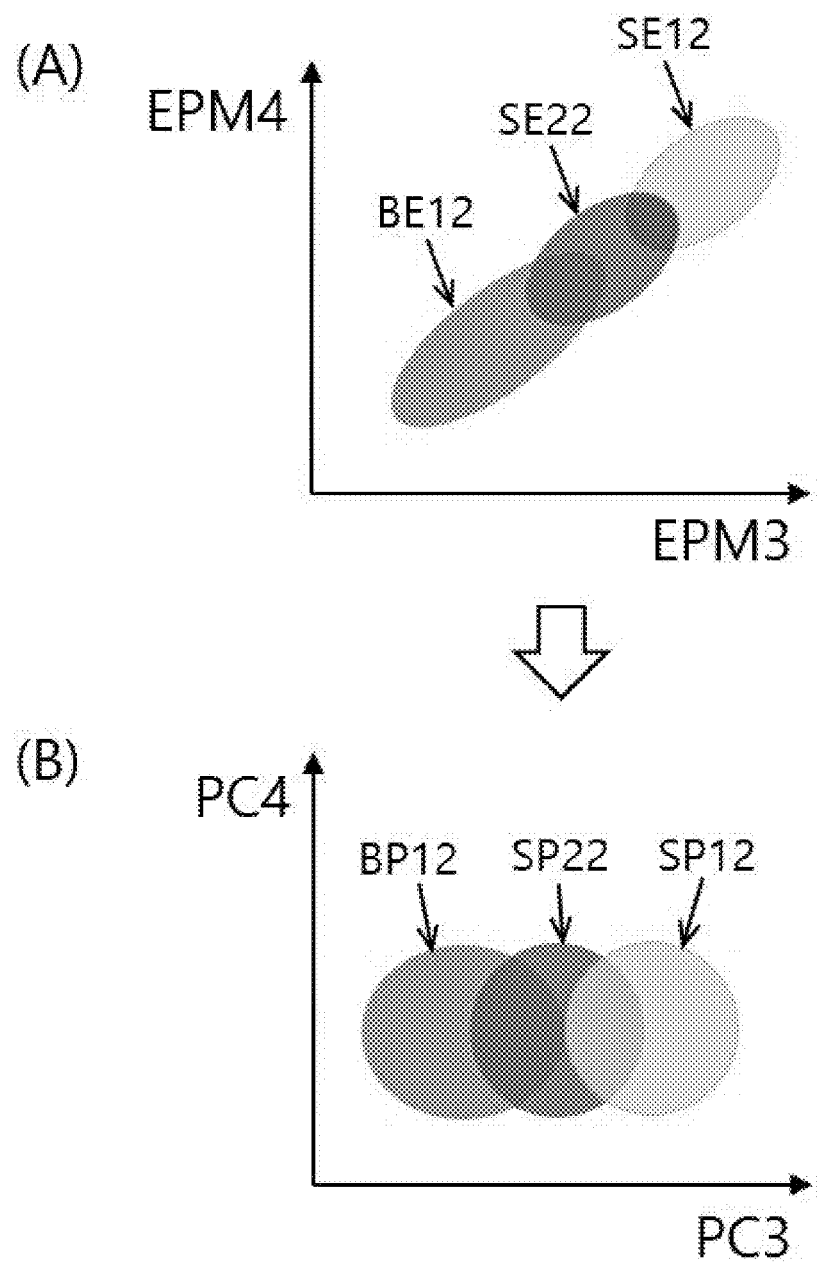
FIG. 7 illustrates a dataset corresponding to two EPMs and a dataset corresponding to two PCs produced therefrom corresponding to two PCs in a process for setting semiconductor device manufacturing parameter according to an embodiment of the present invention.
Figure 8:
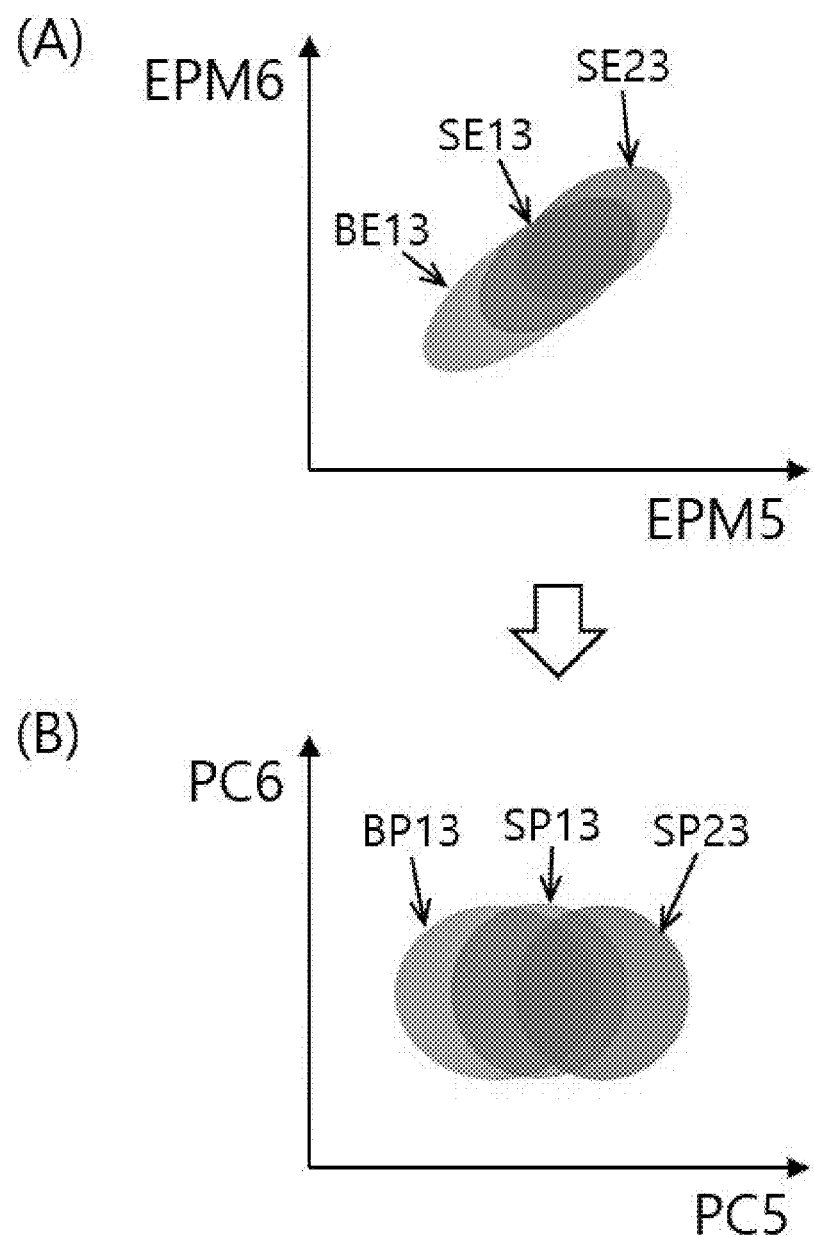
FIG. 8 illustrates another dataset corresponding to two EPMs and another dataset corresponding to two PCs produced therefrom in a process for setting semiconductor device manufacturing parameter according to an embodiment of the present invention.

Multiple EPM pairs may exist, and multiple PC pairs may also exist. Depending on the type (group) of the EPM pair, various types of datasets may be derived. FIG. 7 and FIG. 8 are the diagrams illustrating datasets derived according to a process different from that of FIG. 6.

FIG. 7 is a diagram illustrating a dataset [(A) graph] between EPM3 and EPM4 and a dataset [(B) graph] between PC3 and PC4 converted therefrom in a process for setting the semiconductor device manufacturing parameter according to an embodiment of the present invention.

Referring to FIG. 7, a PC-based dataset including a PC dataset BP12 and conditional split PC datasets SP12, SP22 may be derived by converting a baseline EPM dataset BE12 and conditional split EPM datasets SE12, SE22 into the PC domain corresponding to a plurality of PCs extracted from the baseline EPM dataset BE12. The baseline PC dataset BP12, the first conditional split PC dataset SP12, and the second conditional split PC dataset SP22 in the (B) graph may be obtained by converting the baseline EPM dataset BE12, the first conditional split EPM dataset SE12, and the second conditional split EPM dataset SE22 as the (A) graph into the PC domain. It can be seen that there is no correlation between PC3 and PC4 in the PC-based dataset of the (B) graph.

FIG. 8 is a diagram illustrating a dataset [(A) graph] between EPM5 and EPM6 and a dataset [(B) graph] between PC5 and PC6 converted therefrom in a process for setting semiconductor device manufacturing parameter according to an embodiment of the present invention.

Referring to FIG. 8, a PC-based dataset including a PC dataset BP13 and conditional split PC datasets SP13, SP23 may be derived by converting a baseline EPM dataset BE13 and conditional split EPM datasets SE13 and SE23 into the PC domain corresponding to a plurality of PCs extracted from the baseline EPM dataset BE13. The baseline PC dataset BP13, the first conditional split PC dataset SP13, and the second conditional split PC dataset SP23 may be obtained as illustrated in (B) graph by converting the baseline EPM dataset BE13, the first conditional split EPM dataset SE13, and the second conditional split EPM dataset (SE23) as (A) graph into the PC domain. It can be seen that there is no correlation between PC5 and PC6 in the PC-based dataset of the (B) graph.

According to an embodiment of the present invention, PCs which are effectively changed by each of a plurality of conditional splits may be determined through data processing for the PC-based datasets illustrated in FIGS. 6 to 8. For example, a PC whose accuracy is greater than or equal to a threshold value may be derived by performing data clustering on the PC-based dataset, and calculating accuracy of conditional split label classification according to the conditional split. In addition, a variance inflation factor (VIF) and an explained variance (EV) may be calculated for the PC-based dataset to derive a combination of PCs having the VIF equal to or higher than a threshold value or a PC having an EV equal to or higher than a threshold level.

In the graph (B) of FIG. 6, since BP11, SP11, and SP21 exist independently and apart from each other, the accuracy of conditional split label classification due to data clustering in the PC-based dataset corresponding to the graph (B) may be high. Meanwhile, since BP12, SP12, and SP22 overlap in the graph (B) of FIG. 7, the accuracy of conditional split label classification due to data clustering may decrease and an error rate may increase. In addition, since BP13, SP13, and SP23 overlap in the graph (B) of FIG. 8, the accuracy of conditional split label classification due to data clustering may decrease and an error rate may increase. In the case of FIG. 8, since the overlap area is larger than that of FIG. 7, the accuracy of conditional split label classification may be lower than that of FIG. 7. Therefore, according to an embodiment of the present invention, the case shown in FIG. 6 may be determined as a PC (a major PC or an effective PC) which is effectively (significantly) changed by the conditional split. In the graph (B) of FIG. 6, SP11 according to the first conditional split may be significantly changed with respect to BP11, and SP21 according to the second conditional split may also be significantly changed with respect to BP11. Meanwhile, in the case of FIG. 8, even if the condition is changed in the first and second conditional splits, the data on the EPM domain and the PC domain may not be changed significantly as compared to the baseline condition.

In the graph (B) of FIG. 7, since BP12, SP12, and SP22 overlap to some extent, the accuracy of conditional split label classification according to data clustering may decrease. However, in the graph (B) of FIG. 7, an increased explained variance (EV) value may be shown in an axial direction corresponding to PC3. In other words, it can be seen that a somewhat significant translation of the data appeared in the axial direction corresponding to PC3 due to the first conditional split and the second conditional split. Therefore, when compared to the case where only BP12 exists, the EV value may be increased when BP12, SP12, and SP22 exist together. Therefore, even in the case of FIG. 7, it is possible to classify the data as having changed significantly to some extent by the conditional split. Even when a variance inflation factor (VIF) is calculated for the PC-based dataset, and the VIF is greater than or equal to a threshold value, it may be classified as having a significant change.

As described with reference to FIGS. 6 to 8, according to an embodiment of the present invention, a PC which is effectively (significantly) changed by each of a plurality of conditional splits may be determined through data processing of the PC-based dataset. For example, in the example of FIG. 6, principle component PC1 is effectively (significantly) changed by the conditional split used to generate SE21 (corresponding to SP21), and principle component PC2 is effectively (significantly) changed by the conditional split used to generate SE11 (corresponding to SP11). In addition, for the EPM-based dataset, it is possible to determine an EPM which is effectively (significantly) changed by each of a plurality of conditional splits through similar data processing.

Although three EPM pairs and three PC pairs have been described in FIGS. 6 to 8 as the examples, in reality, dozens or more EPM pairs and dozens or more PC pairs may exist.

Figure 9:
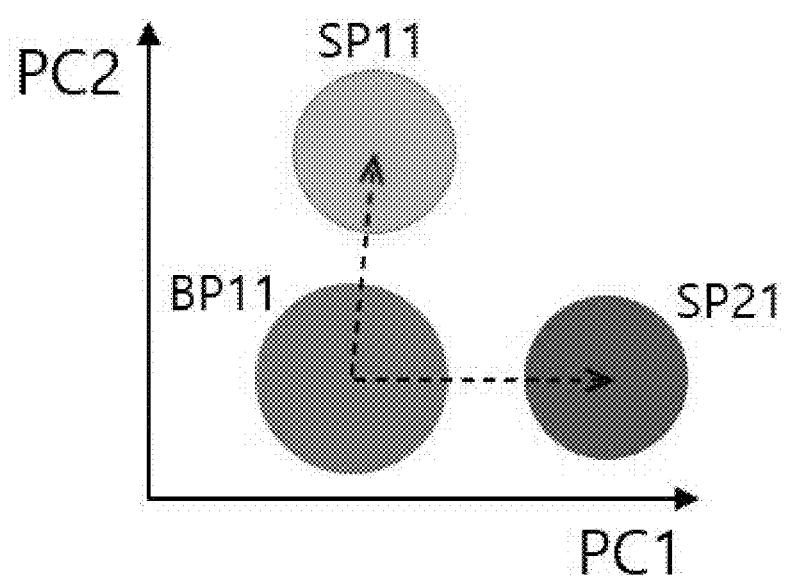
FIG. 9 is a graph illustrating split variation information due to a conditional split which can be applied to a process for setting semiconductor device manufacturing parameter according to an embodiment of the present invention.

FIG. 9 is a graph for explaining split variation information due to a conditional split which may be applied to a process for setting semiconductor device manufacturing parameter according to an embodiment of the present invention.

Referring to FIG. 9, it is possible to determine a PC (i.e., a major PC or an effective PC) which is effectively (significantly) changed by each of the plurality of conditional splits through data processing on the PC-based dataset. Split variation information according to each of the plurality of conditional splits may be obtained by using information on PCs which are effectively (significantly) changed. Here, the split variation information may be information on how much and in which direction specific PCs are moved from a reference point corresponding to the baseline condition by a corresponding conditional split. For example, a dotted line arrow drawn from the center point of BP11 to the center point of SP11 in FIG. 9 may correspond to a split variation information due to the first conditional split. Also, a dotted line arrow drawn from the center point of BP11 to the center point of SP21 may correspond to a split variation information due to the second conditional split. The split change information may be determined for all major PCs other than PC1 and PC2 only. It is possible to derive information for process feedback for realizing an 'optimal point' later by obtaining and using such split variation information.

Meanwhile, in the embodiment of the present invention, when the conditional split and the corresponding PC are matched on the basis of the PC domain, matching accuracy may be further improved compared to a case wherein the conditional split and the corresponding EPM are matched on the basis of the EPM domain. For example, in the case of determining/analyzing the change of SE11 to BE11 based on the EPM domain in the graph (A) of FIG. 6, as the change in the direction of EPM1 may be overlooked, the accuracy of the determination/analysis may be somewhat lowered. However, when determining/analyzing the change of SP11 to BP11 based on the PC domain in the graph (B) of FIG. 6, the change in the PC1 direction and the change in the PC2 direction may be accurately determined/analyzed.

Figure 10:
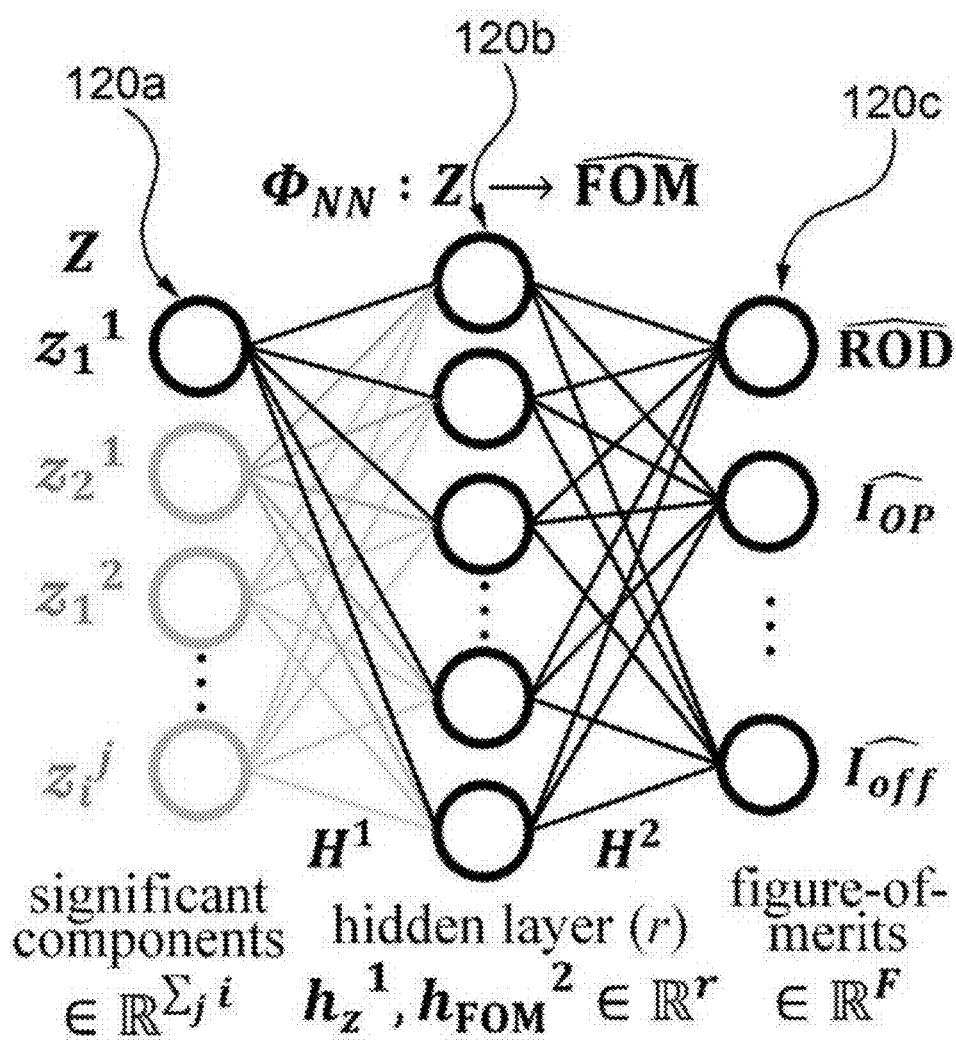
FIG. 10 illustrates a process for predicting a figure of merit (FOM) of a semiconductor device by using an artificial neural network in a process for setting semiconductor device manufacturing parameter according to an embodiment of the present invention.

FIG. 10 is a diagram illustrating a process for predicting a figure of merit (FOM) of a semiconductor device by using an artificial neural network in a process for setting semiconductor device manufacturing parameter according to an embodiment of the present invention.

Referring to FIG. 10, an artificial neural network 120 may include an input layer 120a, a hidden layer 120b, and an output layer 120c. Here, data values ($z_1^1$, $z_2^1$, $z_1^2$, $z_i^j$) (where i is a number of the main correlation axis within a group, j is a number of groups) of electrical measurement parameters (i.e., converted EPMs) based on the main correlation axis of the corresponding group may be input to the input layer 120a. Then, the artificial neural network 120 may output the predicted value of the figure of merit (FOM) of the semiconductor device from the output layer 120c through the hidden layer 120b. At this time, since the data values of the electrical measurement parameters (i.e., converted EPMs) are used as inputs based on the main correlation axis of the corresponding group, the electrical measurement parameters are independently changed even within the group to determine the figure of merit (FOM) of the semiconductor device.

In step S40 described in FIG. 1, the figure of merit (FOM) of the semiconductor device may be predicted by using the artificial neural network 120 based on the PC-based dataset. In this case, the artificial neural network 120 having data of the PC-based dataset (i.e., converted EPM data) as an input value and a predetermined figure of merit (FOM) of a semiconductor device as an output value may be used. In other words, it is possible to predict the figure of merit (FOM) through the artificial neural network 120 by using the EPM (i.e., the converted EPM) as an input value based on the values of the main correlation axis. The predicted figure of merit (FOM) data may be used to calculate the sensitivity of the figure of merit of the semiconductor element and to derive an optimal parameter (i.e., optimal point) capable of optimizing the figure of merit of the semiconductor element. According to an embodiment, an optimal parameter (i.e., optimal point) capable of optimizing a figure of merit (FOM) of a semiconductor device may be derived by using a conjugate gradient technique. The optimal parameter (i.e., optimal point) may be an EPM-based parameter.

Figure 11:
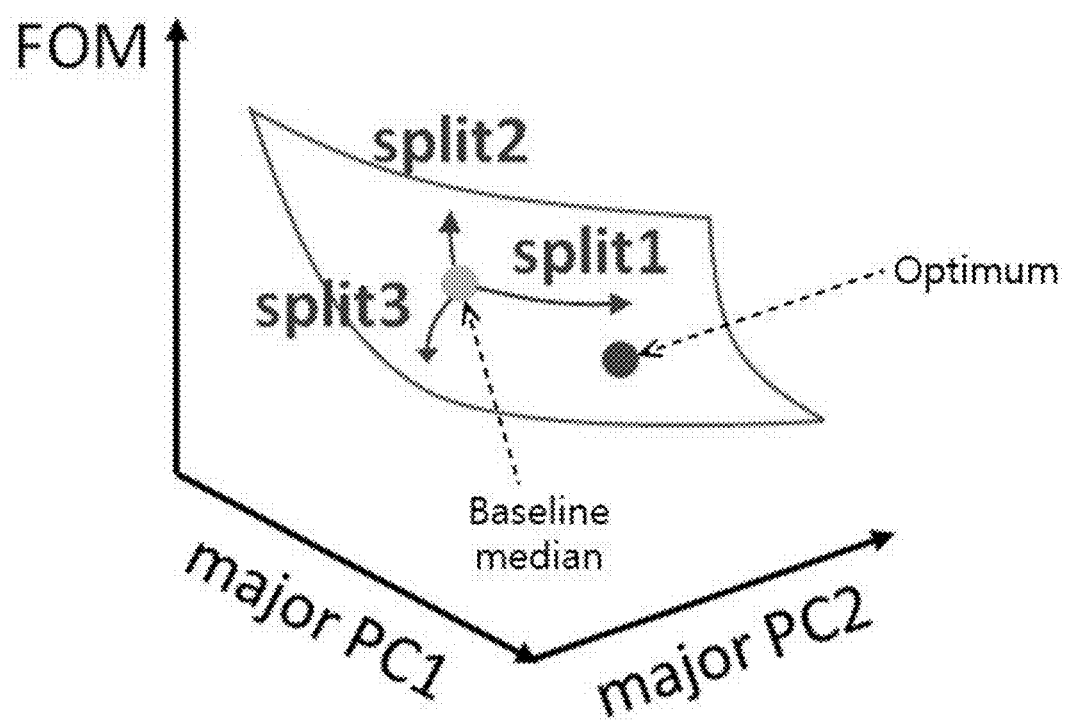
FIG. 11 is a 3D graph illustrating a baseline median point, an optimal point in a major PC domain, and variation information of each conditional split according to an illustrative embodiment of the present invention.

FIG. 11 is a 3D graph illustrating a baseline median point (indicated by light gray dot), an optimal point (indicated by dark gray dot) in a major PC domain and variation information of each conditional split according to an exemplary embodiment of the present invention.

Referring to FIG. 11, it is possible to check the split variation information (direction and variation amount) caused by each conditional split (split 1, 2, 3) from the baseline median point. Information on how to reach the optimal point of the FOM from the baseline median point may be derived by using the split variation information for each conditional split. Here, only 3 conditional splits and 2 major PCs are shown as an example, but in reality, many conditional splits and many major PCs may exist.

Figure 12:
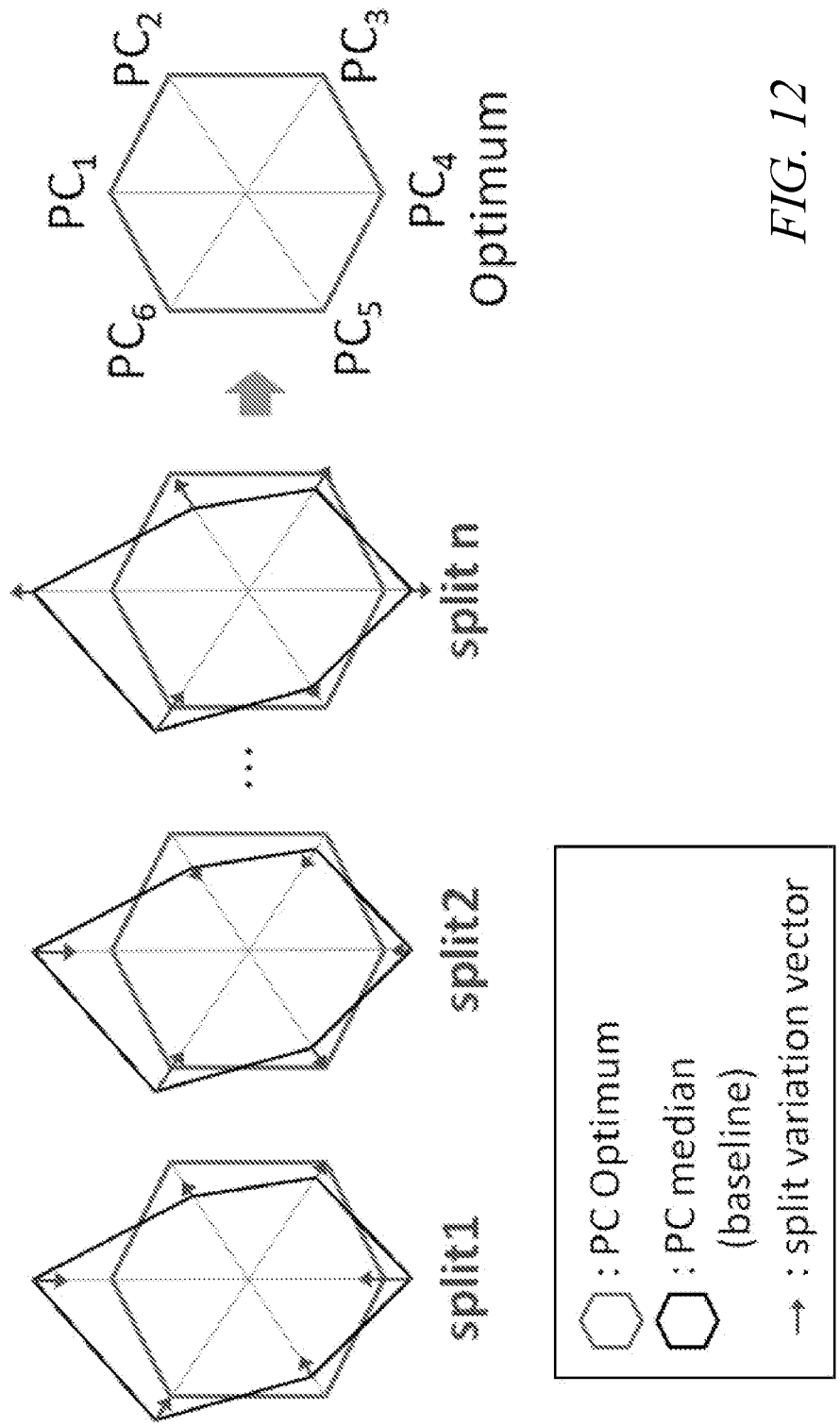
FIG. 12 is a conceptual diagram illustrating a process of deriving information for realizing an optimal point by using split variation information based on conditional splits according to an embodiment of the present invention.

FIG. 12 is a conceptual diagram illustrating a process of deriving information for realizing an optimal point by using split variation information based on conditional splits according to an embodiment of the present invention.

Referring to FIG. 12, a regular hexagon shows a state corresponding to an optimal point of FOM, and vertices of the regular hexagon may correspond to optimal points of major PCs (effective PCs) ($PC_1$~$PC_6$). On the other hand, a hexagon having a changed shape (i.e., distorted) shows a state corresponding to the baseline condition, and the vertices of the distorted hexagon may correspond to the points of the major PCs (effective PCs) ($PC_1$~$PC_6$) according to the baseline condition. In other words, the distorted hexagon may represent a state corresponding to a baseline median point. Arrows shown at each vertex of the distorted hexagon represent a split variation vector caused by a corresponding split (split 1, 2, ... , n). The split variation vector may include information (direction/variation amount) of how much the major PCs have moved into which direction from the point corresponding to the baseline condition by the corresponding split (split 1, 2, ... , n); for example, the left-most portion of FIG. 12 labeled "split 1" shows the regular hexagon corresponding to an optimal point, the distorted hexagon corresponding to a baseline median point superimposed thereon, and arrows at the vertexes of the distorted hexagon corresponding to the direction and variation of each PC for split 1. The split variation vector may correspond to the split variation information described above. Here, for convenience, the case where there are six major PCs ($PC_1$~$PC_6$) is shown, but in reality, there may be dozens or more than 100 major PCs.

The process for setting semiconductor device manufacturing parameter according to an embodiment of the present invention may be configured so that the step for deriving information for process feedback for realizing an optimal point by using the split variation information may be performed using Equation 3 below.

$$\text{Optimal } PCs - \text{Median } PCs = c_1 \cdot S_1 + c_2 \cdot S_2 + \ldots + c_n \cdot S_n, \quad \text{[Equation 3]}$$

$$S_i = \begin{pmatrix} i_1 \cdot \vec{z_1} \\ i_2 \cdot \vec{z_2} \\ \vdots \\ i_m \cdot \vec{z_m} \end{pmatrix}$$

Here, the Optimal PCs is an optimized PC combination including a plurality of PCs corresponding to the optimal point, the Median PCs is a baseline PC combination including a plurality of PCs corresponding to the baseline, the $S_1$, $S_2$ and $S_n$ is a split variation vector by each of the plurality of conditional splits, the $c_1$, $c_2$ and $c_n$ are constants, the split variation vector $S_i$ includes effective major PC vectors ($z_1$, $z_2$, ... , $z_m$) which are changed from the baseline PC combination due to the conditional split, and the $i_1$, $i_2$ and $i_m$ are constants.

In Equation 3, constant values $c_1$, $c_2$ and $c_n$ by which PCs may be varied by an amount corresponding to the difference between the Optimal PCs and the Median PCs may be obtained. This may be referred to as constant values ($c_1$, $c_2$, ... , $c_n$) which may change the Median PCs into the Optimal PCs. When these constant values are obtained, information on how to change a process to implement the optimal point from the baseline condition may be derived based on the information of the constant values. Information on how conditions of which conditional splits should be combined to implement the optimal point may be derived. Accordingly, process feedback for realizing the optimal point may be provided by using the split variation information. The process feedback may be provided as quantitative information and may be used to configure a process for fabricating a semiconductor device.

As an example, assuming that the number of conditional splits is 6 in total, when $c_1$ is 2, $c_2$ is 1, $c_3$ is 0, $c_4$ is 1.5, $c_5$ is 2, and $c_6$ is 0.5, which satisfies Equation 3, it is possible to provide a process feedback indicating that the optimal point can be reached if the overall experimental conditions are changed so that the change amount of the result due to the change in the experimental condition of split 1 may be doubled, the change amount of the result due to the change in the experimental condition in split 2 may be one times, the change amount of the result due to the change in the experimental condition in split 3 may be zero times, the change amount of the result due to the change in the experimental condition of split 4 may be 1.5 times, the change amount of the result due to the experiment condition change of the split 5 may be 2 times, and the change amount of the result due to the experiment condition change of the split 6 may be 0.5 times.

The information derivation process for realizing the optimal point described above may target conditional splits that may be independently combined, and in the case of conditional splits that cannot be independently combined but whose degree may be adjusted, they may be considered as coaxial (i.e., the same kind) splits, and the impact or related information caused by them may be separately provided to developers or engineers. This information may also be included in information for process feedback for implementing the optimal point.

Figure 13:
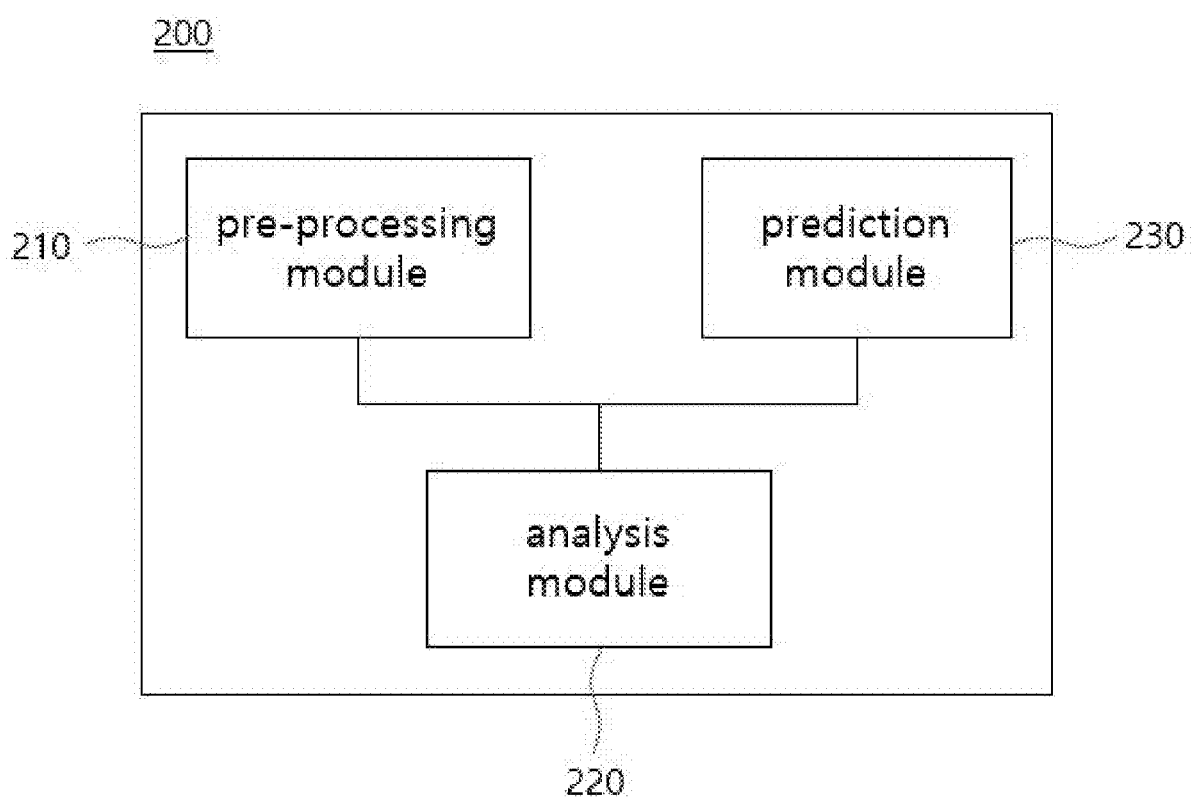
FIG. 13 is a block diagram showing an apparatus for setting semiconductor device manufacturing parameter according to an embodiment of the present invention.

FIG. 13 is a block diagram of an apparatus 200 for setting a semiconductor device manufacturing parameter according to an embodiment of the present invention.

Referring to FIG. 13, the apparatus 200 for setting semiconductor device manufacturing parameter according to an embodiment of the present invention may include a pre-processing module 210 and an analysis module 220. In addition, the apparatus 200 for setting semiconductor device manufacturing parameter may further include a prediction module 230. In this specification, the term, 'module' may mean a functional and structural combination of hardware for implementing the technical concept of the present disclosure and software for driving the hardware. For example, the 'module' may mean a predetermined code and a logical unit of hardware resources for executing the predetermined code, and may not necessarily mean a physically connected code or one type of hardware.

The pre-processing module 210 may be configured to determine an EPM (electrical measurement parameter) group that has a correlation in a baseline EPM dataset including a plurality of EPMs measured from a baseline semiconductor device manufactured under a baseline condition corresponding to a basic experimental condition for setting semiconductor device manufacturing parameters, to derive a plurality of principal components (PCs) corresponding to main correlation axes between EPMs in the EPM group by performing data component analysis for the EPM group, and to derive a PC-based dataset including a conditional split PC dataset and a baseline PC dataset by converting a conditional split EPM dataset and the baseline EPM dataset into a PC domain corresponding to the plurality of PCs derived by the data component analysis applied to the baseline EPM dataset, the conditional split EPM dataset including a plurality of EPMs measured from each of a plurality of conditional split semiconductor devices manufactured by a plurality of conditional splits having conditions changed from the baseline condition.

According to an embodiment, the pre-processing module 210 may be configured to perform data correction through oversampling and/or undersampling for at least one of the baseline EPM dataset and the conditional split EPM dataset in order to correct an imbalance in amount of data between the baseline EPM dataset and the conditional split EPM dataset. In this case, the pre-processing module 210 may be configured to perform the data correction between the derivation of the plurality of PCs and the derivation of the PC-based dataset.

The analysis module 220 may be configured to derive information for process feedback to implement, to determines a PC which is effectively changed by each of the plurality of conditional splits through data processing on the PC-based dataset, to obtain split variation information for each of the plurality of conditional splits, to extract an optimum point capable of optimizing a figure of merit (FOM) of a semiconductor device within a range of the PC-based dataset, and to derive an optimum point by using the split variation information.

In order to determine a PC which is effectively changed by each of the plurality of conditional splits through the data processing of the PC-based dataset, the analysis module 220 may be configured to perform data clustering on the PC-based dataset and to calculate the accuracy of conditional split label classification according to the conditional split so that a PC whose accuracy is higher than or equal to a threshold value may be derived.

In addition, in order to determine a PC which is effectively changed by each of the plurality of conditional splits through the data processing of the PC-based dataset, the analysis module 220 may be configured to calculate a variance inflation factor (VIF) and an explained variance (EV) for the PC-based dataset to derive a PC combination in which the VIF is greater than or equal to a threshold value, a PC in which the EV is increased to a threshold level or more, or both.

In addition, the analysis module 220 may be configured to determine an EPM which is effectively (significantly) changed by each of the plurality of conditional splits through data processing on EPM-based datasets including the baseline EPM dataset and the conditional split EPM dataset. In this case, the analysis module 220 may be configured to determine the EPM and PC which are effectively (significantly) changed by each of the plurality of conditional splits through data processing for an EPM-based dataset including the baseline EPM dataset and the conditional split EPM dataset, and a PC-based dataset including the baseline PC dataset and the conditional split PC dataset. In addition, in this case, the analysis module 220 may perform data clustering on the EPM-based dataset including the baseline EPM dataset and the conditional split EPM dataset, and accuracy of conditional split label classification according to the conditional split (accuracy of classification according to clustering) may be calculated to derive an EPM having the accuracy equal to or greater than a threshold value. In this case, clustering of EPM pairs may be performed in the EPM-based dataset, and an EPM with high accuracy may be derived by calculating accuracy of conditional split label classification. It is possible to extract the EPM which is effectively (significantly) changed by the corresponding conditional split through this process. The analysis module 220 may match an EPM (or a plurality of EPMs) satisfying a corresponding condition as an EPM (or a plurality of EPMs) which are effectively (significantly) changed by the corresponding conditional split. The analysis module 220 may match PCs and EPMs that satisfy the corresponding conditions as described above as PCs and EPMs which are effectively (significantly) changed by the corresponding conditional split.

The analysis module 220 may be configured to extract the optimal point by using an artificial neural network. According to an embodiment, the apparatus 200 for setting semiconductor device manufacturing parameter may further include the prediction module 230 which predicts, using an artificial neural network, a figure of merit (FOM) of the semiconductor device based on the PC-based dataset. However, in some cases, the function of the prediction module 230 may be incorporated into the analysis module 220.

The analysis module 220 may be configured to perform a calculation according to the above Equation 3 in order to derive information for process feedback for implementing the optimal point by using the split variation information.

Various features of the semiconductor device manufacturing parameter setting process described with reference to FIGS. 1 to 12 may be applied to the semiconductor device manufacturing parameter setting device according to an embodiment of the present invention to the extent that they are not contradictory.

Figure 14:
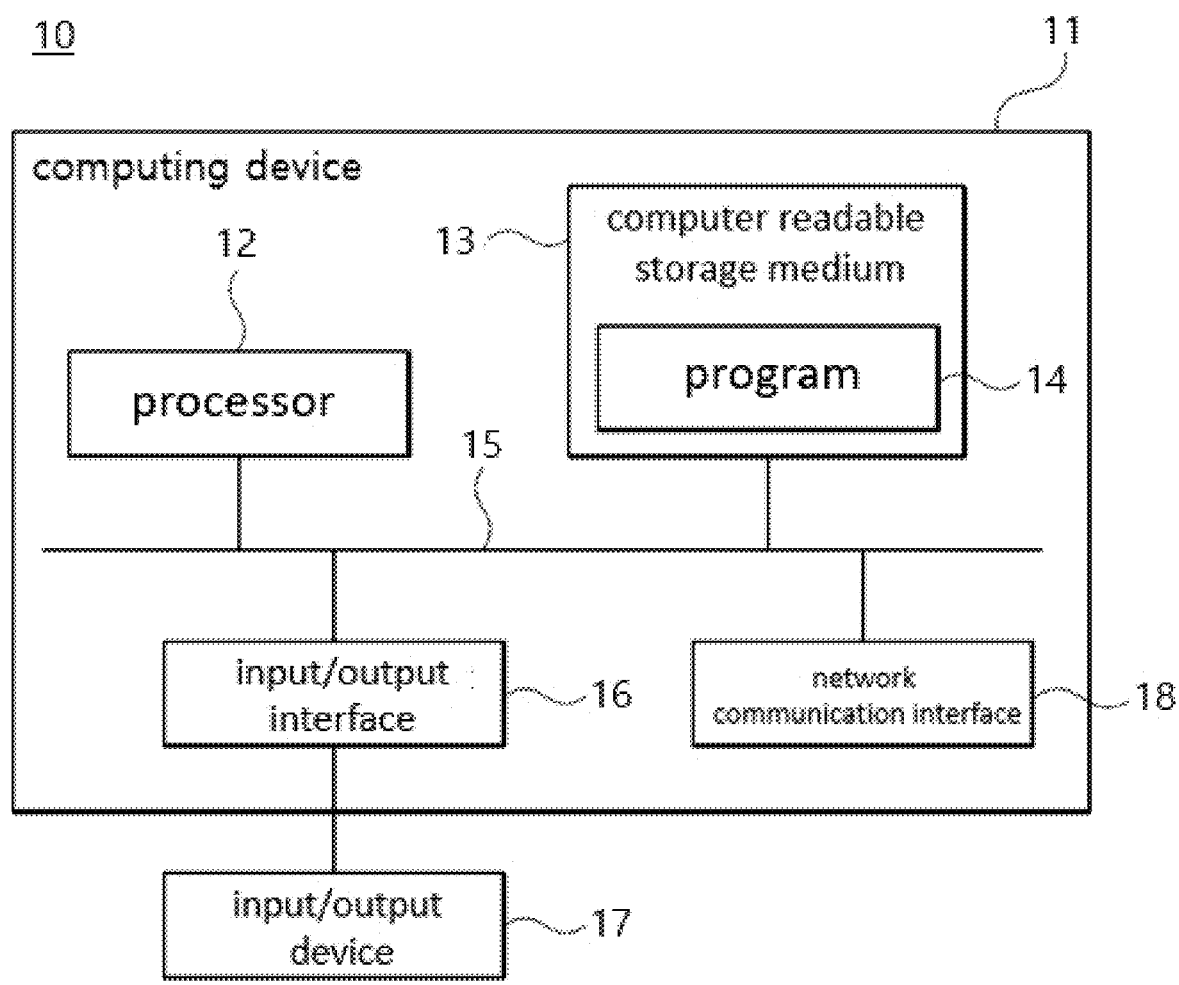
FIG. 14 is a block diagram illustrating a computer program for setting semiconductor device manufacturing parameter according to an embodiment of the present invention is applied.

FIG. 14 is a block diagram illustrating a computer program to which a process for setting semiconductor device manufacturing parameter according to an embodiment of the present invention is applied.

Referring to FIG. 14, the illustrated computing environment 10 includes a computing device 11. The computing device 11 may be or include an apparatus for setting semiconductor device manufacturing parameter. The computing device 11 may include at least one processor 12, a non-transitory computer readable storage medium 13 and a communication bus 15. The processor 12 may cause the computing device 11 to perform operations in accordance with the example embodiments described above. The processor 12 may execute one or more programs 14 stored in the computer readable storage medium 13. The one or more programs 14 may include one or more computer executable instructions, and when the computer executable instructions are executed by the processor 12, it may be configured to enable the computing device 11 to perform operations according to the embodiments.

The computer readable storage medium 13 may be configured to store computer-executable instructions or program code, program data and/or other suitable forms of information. The program 14 stored in the computer readable storage medium 13 may include a set of instructions executable by the processor 12. When one or more instructions included in program 14 are executed by computing device 11 having one or more processors 12, the processor may enable the computing device 11 to perform operations in accordance with the example embodiments described above. The operations according to the above embodiments may include the operations described with reference to FIGS. 1 to 12 and the related characteristics. In one embodiment, the computer readable storage medium 13 may be a memory (a volatile memory such as a random access memory, a non-volatile memory, or a suitable combination thereof), one or more magnetic disk storage devices, optical disk storage devices, flash memory devices, other forms of storage media which may be accessed by the computing device 11 and store desired information, or suitable combinations thereof.

A communication bus 15 may interconnect various other components of computing device 11 as well as a processor 12 and a computer readable storage medium 13. The computing device 11 may also include one or more input/output interfaces 16 providing interfaces for one or more input/output devices 17 and one or more network communication interfaces 18. The input/output interface 16 and the network communication interface 18 may be connected to the communication bus 15. The input/output device 17 may be coupled to other components of computing device 11 via the input/output interface 16. For example, the input/output device 17 may include input devices such as a pointing device (such as a mouse or trackpad), a keyboard, a touch input device (such as a touchpad or touchscreen), a voice or sound input device, various types of sensor devices, and/or a photographing device, and/or output devices such as display devices, printers, speakers, and/or network cards. In addition, the input/output device 17 may be included inside the computing device 11 as a component constituting the computing device 11, or may be connected to the computing device 11 as a separate device distinguished from the computing device 11.

According to the embodiments of the present invention described above, it is possible to implement a method and an apparatus for determining a semiconductor device manufacturing parameter, which may find an optimal parameter combination (e.g., optimal EPM combination) capable of optimizing the performance of a semiconductor device, and may provide a process feedback for implementing the optimal parameter combination in an actual semiconductor device process. In particular, according to the embodiments of the present invention, it is possible to more accurately specify the target of the independent variable to be optimized, and to provide specific process feedback on the process condition changes which may implement the derived optimal parameter combination (e.g., optimal EPM combination) by deriving a main correlation axis by considering the statistical correlation inherent in EPMs, and through correlation matching between process conditional splits and the main correlation axis between EPMs. In addition, according to embodiments of the present invention, it is possible to implement a method and an apparatus for determining a semiconductor device manufacturing parameter which are capable of enhancing the suitability and accuracy of machine learning using an artificial neural network by balancing unbalanced process condition datasets that may be produced in a semiconductor device manufacturing parameter setting.

In this specification, the preferred embodiments of the present invention have been disclosed, and although specific terms have been used, they are only used in a general sense to easily explain the technical content of the present invention and to help understanding the present invention, and they are not used to limit the scope of the present invention. A person having ordinary skill in the related art to which the present invention belong would understand that other modifications based on the technical idea of the present invention may be implemented in addition to the embodiments disclosed herein. a person having ordinary skill in the related art would understand that in connection with a method and an apparatus for setting semiconductor device manufacturing parameter according to the embodiments described with reference to FIGS. 1 to 14, various substitutions, changes, and modifications may be made without departing from the technical spirit of the present invention. Therefore, the scope of the invention should not be determined by the described embodiments, but should be determined by the technical concepts described in the claims.

[Explanation of Symbols]
Denotation explanation of the main parts of the drawings *

| | |
|---|---|
| 10: computing environment | 11: computing device |
| 12: processor | 13: computer readable storage medium |
| 14: program | 15: communication bus |
| 16: input/output interface | 17: input/output device |
| 18: network communication interface | |
| 200: apparatus for semiconductor parameter setting | |
| 210: pre-processing module | |
| 220: analysis module | |
| 230: prediction module | |

What is claimed is:

1. A method for performing semiconductor device manufacturing, the method comprising:

determining an EPM (electrical measurement parameter) group having a correlation in a baseline EPM dataset, the baseline EPM dataset including a plurality of EPMs measured from a baseline semiconductor device manufactured under a baseline condition corresponding to a basic experimental condition for setting semiconductor device manufacturing parameters;

deriving a plurality of PCs (principal components) corresponding to main correlation axes between EPMs in the EPM group by performing data component analysis on the EPM group;

deriving a PC-based dataset including a conditional split PC dataset and a baseline PC dataset by converting a conditional split EPM dataset and the baseline EPM dataset into a PC domain corresponding to the plurality of PCs based on the baseline EPM dataset, the conditional split EPM dataset including a plurality of EPMs measured from each of a plurality of conditional split semiconductor devices manufactured under a plurality of conditional splits having conditions different from the baseline condition;

determining a PC which is effectively changed by each of the plurality of conditional splits through data processing on the PC-based dataset, and obtaining split variation information caused by each of the plurality of conditional splits;

extracting an optimal point capable of optimizing a figure of merit (FOM) of a semiconductor device within a range of the PC-based dataset; and deriving information for process feedback for realizing the optimal point by using the split variation information.

2. The method of claim 1, wherein determining the PC which is effectively changed by each of the plurality of conditional splits through the data processing of the PC-based dataset includes performing data clustering on the PC-based dataset, calculating accuracy of conditional split label classification according to the conditional split, and deriving a PC whose accuracy is greater than or equal to a threshold value.

3. The method of claim 1, wherein determining the PC which is effectively changed by each of the plurality of conditional splits through the data processing for the PC-based dataset includes calculating a variance inflation factor (VIF) and an explained variance (EV) for the PC-based dataset and deriving a PC combination having the VIF equal to or greater than a threshold value or a PC having the EV which equal to or greater than a threshold level.

4. The method of claim 1, wherein deriving the information for process feedback for realizing the optimal point by using the split variation information is configured to be performed using the following equation:

$$\text{Optimal } PCs - \text{Median } PCs = c_1 \cdot S_1 + c_2 \cdot S_2 + \ldots + c_n \cdot S_n,$$

$$S_i = \begin{pmatrix} i_1 \cdot \overrightarrow{z_1} \\ i_2 \cdot \overrightarrow{z_2} \\ \vdots \\ i_m \cdot \overrightarrow{z_m} \end{pmatrix}$$

Here, the Optimal PCs is an optimized PC combination including a plurality of PCs corresponding to the optimal point, the Median PCs is a baseline PC combination including a plurality of PCs corresponding to the baseline, the $S_1, S_2, \ldots, S_n$ are split variation vectors caused by each of the plurality of conditional splits, and $c_1, c_2, \ldots, c_n$ are constants, and wherein split variation vector $S_i$ includes effective PC vectors $(z_1, z_2, \ldots, z_m)$ which are changed from the baseline PC combination due to the conditional split, and $i_1, i_2, \ldots, i_m$ are constants.

5. The method of claim 1, further comprising performing data correction through oversampling and/or undersampling on at least one of the baseline EPM dataset and the conditional split EPM dataset to correct an imbalance in an amount of data between the baseline EPM dataset and the conditional split EPM dataset.

6. The method of claim 5, wherein performing the data correction is performed between deriving the plurality of PCs and deriving the PC-based dataset.

7. The method of claim 1, wherein extracting the optimal point is performed by using an artificial neural network.

8. An apparatus for determining a semiconductor device manufacturing parameter, the apparatus comprising:

a pre-processing module and an analysis module, wherein the pre-processing module is configured to:
   determine an EPM (electrical measurement parameter) group that has a correlation in a baseline EPM dataset, the baseline EPM including a plurality of EPMs measured from a baseline semiconductor device manufactured under a baseline condition corresponding to a basic experimental condition for setting semiconductor device manufacturing parameters,
   derive a plurality of principal components (PCs) corresponding to main correlation axes between EPMs in the EPM group by performing data component analysis on the EPM group, and
   derive a PC-based dataset including a conditional split PC dataset and a baseline PC dataset by converting a conditional split EPM dataset and the baseline EPM dataset into to a PC domain corresponding to the plurality of PCs, the conditional split EPM dataset including a plurality of EPMs measured from each of a plurality of conditional split semiconductor devices manufactured under a plurality of conditional splits having the conditions changed from the baseline condition; and wherein the analysis module is configured to:
   determine a PC which is effectively changed by each of the plurality of conditional splits through data processing on the PC-based dataset,
   obtain split variation information caused by each of the plurality of conditional splits,
   extract an optimal point capable of optimizing a figure of merit (FOM) of a semiconductor device within a range of the PC-based dataset, and
   derive information for process feedback for implementing the optimal point using the split variation information.

9. The apparatus of claim 8, wherein the analysis module is configured to perform data clustering on the PC-based dataset, calculate accuracy of conditional split label classification according to the conditional split, and derive a PC whose accuracy is greater than or equal to a threshold value in order to determine a PC which is effectively changed by each of the plurality of conditional splits through the data processing on the PC-based dataset.

10. The apparatus of claim 8, wherein the analysis module is configured to calculate a variance inflation factor (VIF) and an explained variance (EV) for the PC-based dataset to derive a PC combination in which the VIF is greater than or equal to a threshold value or a PC in which the EV is greater than or equal to a threshold level to determine a PC which is effectively changed by each of the plurality of conditional splits through the data processing on the PC-based dataset.

11. The apparatus of claim 8, wherein the analysis module is configured to perform an operation according to the following equation in order to derive the information for process feedback for implementing the optimal point by using the split variation information:

$$\text{Optimal } PCs - \text{Median } PCs = c_1 \cdot S_1 + c_2 \cdot S_2 + \ldots + c_n \cdot S_n,$$

$$S_i = \begin{pmatrix} i_1 \cdot \vec{z_1} \\ i_2 \cdot \vec{z_2} \\ \vdots \\ i_m \cdot \vec{z_m} \end{pmatrix}$$

wherein the Optimal PCs is an optimized PC combination including a plurality of PCs corresponding to the optimal point, the Median PCs is a baseline PC combination including a plurality of PCs corresponding to the baseline, $S_1, S_2, \ldots, S_n$ are split variation vectors caused by each of the plurality of conditional splits, and $c_1, c_2, \ldots, c_n$ are constants, and wherein the split variation vector $S_i$ includes effective PC vectors $(z_1, z_2, \ldots, z_m)$ which are changed from the baseline PC combination due to the conditional split, and $i_1, i_2, \ldots, i_m$ are constants.

12. The apparatus of claim 8, wherein the pre-processing module is configured to perform data correction through oversampling and/or oversampling of at least one of the baseline EPM dataset and the conditional split EPM dataset to correct an imbalance in an amount of data between the baseline EPM dataset and the conditional split EPM dataset.

13. The apparatus of claim 12, wherein the pre-processing module is configured to perform the data correction between deriving the plurality of PCs and deriving the PC-based dataset.

14. The apparatus of claim 8, wherein the analysis module is configured to extract the optimal point using an artificial neural network.

15. The apparatus of claim 8, further comprising a prediction module that predicts, based on the PC-based dataset, the figure of merit (FOM) of the semiconductor device using an artificial neural network.

16. A non-transitory computer readable storage medium including a computer program, the computer program including one or more instructions, the one or more instructions, when executed by a computing device having one or more processors, causes the computing device to:

determine an EPM (electrical measurement parameter) group that has a correlation in a baseline EPM dataset including a plurality of EPMs measured from a baseline semiconductor device manufactured under a baseline condition corresponding to a basic experimental condition for setting semiconductor device manufacturing parameters;

derive a plurality of principal components (PCs) corresponding to main correlation axes between EPMs in the EPM group by performing data component analysis on the EPM group;

derive a PC-based dataset including a conditional split PC dataset and a baseline PC dataset by converting a conditional split EPM dataset and the baseline EPM dataset into to a PC domain corresponding to the plurality of PCs derived by the data component analysis applied to the baseline EPM dataset, the conditional split EPM dataset including a plurality of EPMs measured from each of a plurality of conditional split semiconductor devices manufactured under a plurality of conditional splits having the conditions changed from the baseline condition;

determine a PC which is effectively changed by each of the plurality of conditional splits through data processing on the PC-based dataset, and obtain split variation information caused by each of the plurality of conditional splits;

extract an optimal point capable of optimizing a figure of merit (FOM) of a semiconductor device within a range of the PC-based dataset; and derive information for process feedback for implementing the optimal point using the split variation information.

* * * * *